United States Patent [19]

Oikawa

[11] Patent Number: 5,493,410
[45] Date of Patent: Feb. 20, 1996

[54] PRINTER VARYING PIXEL-SHAPE TO REDUCE JAGGEDNESS

[75] Inventor: Tomohiro Oikawa, Chiba, Japan

[73] Assignee: Sharp Kabushiki Kaisha, Osaka, Japan

[21] Appl. No.: 991,581

[22] Filed: Dec. 15, 1992

[30] Foreign Application Priority Data

| Dec. 19, 1991 | [JP] | Japan | 3-336714 |
| Jun. 17, 1992 | [JP] | Japan | 4-157969 |

[51] Int. Cl.⁶ .............................. H04N 1/40; G06K 9/40; G01D 15/14
[52] U.S. Cl. ..................... 358/298; 358/459; 382/269; 347/131
[58] Field of Search ..................... 358/298, 296, 358/459; 346/107 R, 108, 160; 382/54, 254, 256, 257, 266, 268, 269; 347/129–131, 225, 233, 238

[56] References Cited

U.S. PATENT DOCUMENTS

| 5,017,944 | 5/1991 | Kitamura et al. | 358/298 X |
| 5,225,848 | 7/1993 | Smith et al. | 346/107 R X |
| 5,255,014 | 10/1993 | Haneda et al. | 346/108 |
| 5,262,798 | 11/1993 | Reinten | 346/107 R |
| 5,327,524 | 7/1994 | Ng | 395/108 |
| 5,337,074 | 8/1994 | Thornton | 346/107 R |

FOREIGN PATENT DOCUMENTS

| 0097261 | 1/1984 | European Pat. Off. | G06K 15/12 |
| 0189664 | 8/1988 | European Pat. Off. | H04N 1/036 |
| 0348003A3 | 12/1989 | European Pat. Off. | H04N 1/18 |
| 0388833A3 | 9/1990 | European Pat. Off. | G06K 15/12 |
| 3408187A1 | 9/1984 | Germany | H04N 1/00 |
| 4134988A1 | 4/1992 | Germany | G06F 15/68 |
| 53-052019 | 5/1978 | Japan | G06K 15/10 |
| 58-150978 | 9/1983 | Japan | G03G 15/04 |
| 61-027268 | 2/1986 | Japan | B41J 3/21 |
| 61-123862 | 6/1986 | Japan | G03G 15/04 |
| 61027268 | 6/1986 | Japan | B41J 3/21 |
| 61123862 | 10/1986 | Japan | G03G 15/04 |
| 6158037 | 12/1986 | Japan | G09G 1/14 |
| 3216679 | 9/1991 | Japan | G03G 15/04 |

Primary Examiner—Peter S. Wong
Assistant Examiner—Eric Frahm
Attorney, Agent, or Firm—David G. Conlin; Henry D. Pahl, Jr.; Milton Oliver

[57] ABSTRACT

In a laser printer having a serving semiconductor laser 14 as the printer engine part 3, the irradiation of a laser beam R, forming one pixel, is divided into a plurality of lighting times, and non-lighting times in response to clock horizontal synchronous signals CLKH1 and CLKH2, generated by a printer controller 2, so that the form of a light energy distribution, on a photosensitive body, for forming one pixel is made substantially trapezoidal. With this construction, the form of each dot of pixels composing an image is made substantially trapezoidal. This can lead to improving the image quality of any curve d portion and the sloped-line portion of the image, by reducing jaggedness.

11 Claims, 39 Drawing Sheets

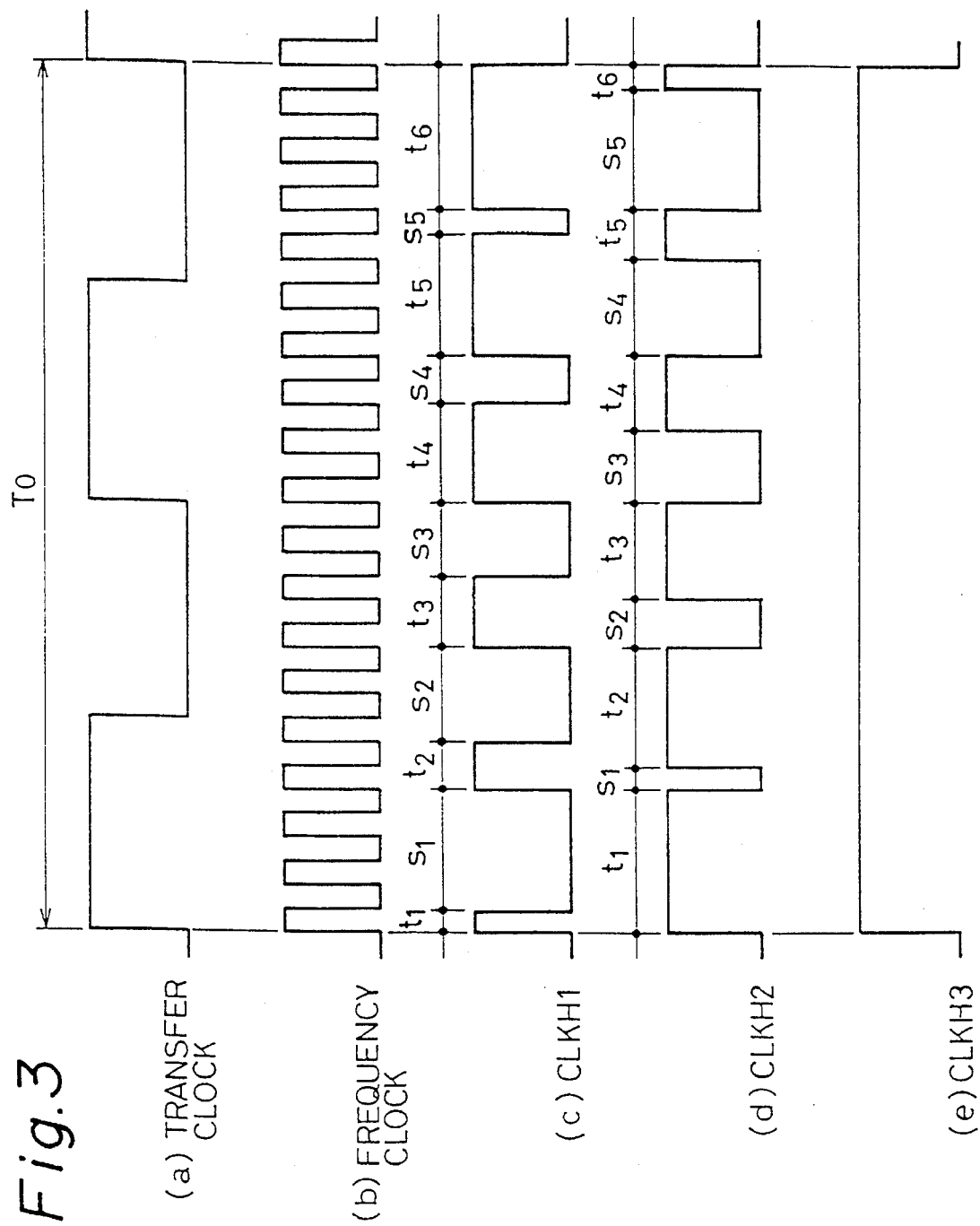

MAIN SCANNING DIRECTION
SUB SCANNING DIRECTION

MAIN SCANNING DIRECTION
SUB SCANNING DIRECTION

MAIN SCANNING DIRECTION
SUB SCANNING DIRECTION

MAIN SCANNING
DIRECTION →

SUB SCANNING
DIRECTION ↓

MAIN SCANNING
DIRECTION →

SUB SCANNING
DIRECTION ↓

PRINTER VARYING PIXEL-SHAPE TO REDUCE JAGGEDNESS

BACKGROUND OF THE INVENTION

1. Field of the Invention

The present invention relates to an image forming apparatus which forms as a latent image a picture consisting of a plurality of pixels on the surface of a photosensitive body based on a picture signal indicating text and graphic data.

2. Description of the Related Art

Conventionally, in general, a laser printer having a semiconductor laser as a light source operates to apply a laser beam, deflectively scanned by a rotary polygonal mirror or the like, to a rotary photosensitive body for forming an electrostatic latent image corresponding to the picture on the surface of a photosensitive body. The printer then takes the steps of developing, transferring, fixing the latent image and finally recording the image on a transfer sheet of paper. The direction of scanning done by the rotary polygonal mirror is referred to as a "main scanning" direction and the direction of rotation of the photosensitive body, that is, the feeding direction of the sheet is referred to as a "sub scanning" direction. The rotary speed of the photosensitive body may be far lower than that of the rotary polygonal mirror and thus is negligible.

For forming the electrostatic latent image on the surface of the photosensitive body, the laser printer is arranged to apply light energy sufficient to form one pixel onto the photosensitive body by operating the semiconductor laser for a certain length of time; this operating time is referred to a pulse width. Such pixels forming one line are formed in the main scanning direction. Then, those lines are formed in the sub scanning direction so that the dot matrix for one sheet of paper is formed on the surface of the photosensitive body. The form of one pixel, formed on the surface of the photosensitive body by the above method, is defined depending on the recording density of a laser beam applied to the photosensitive body. As such, the form of a laser beam spot on the photosensitive body is often chosen to be elliptical by considering the far field pattern characteristics of the semiconductor laser.

In a case that, therefore, the laser spot on the photosensitive body is elliptical (where the diameter of the main scanning direction is denoted by Wx and the diameter of the sub scanning direction is denoted by Wy), assuming that an area, having a magnitude of light energy applied on the photosensitive body equal to or larger than a constant value (for example, the constant value is one $[\mu J/cm^2]$, if the area having a larger magnitude of light energy being equal to or larger than a value of a $[\mu J/cm^2]$ becomes an image at the final stage) is made to be a part where oblique lines are depicted as shown in FIG. 38. The light energy density of the laser beam forms a Gaussian distribution. Hence, by inputting beam-radiating conditions such as a laser output, a pulse width, a scan speed in the main scan direction, and an elliptical beam diameter as input parameters, the distribution of the light energy applied on the photosensitive body can be calculated and derived as a numerical value. The area having the larger magnitude of light energy than a $[\mu J/cm^2]$ derived by the above calculation is made to be substantially elliptical.

Normally, one pixel of 300 dpi (dot per inch) is a substantially elliptic form whose diameter is about 80 to 100 µm. Hence, the sloped part contained in a character or a graphic is formed to have a stepwise jaggy, which is not desirable in terms image quality. As the recording density increases, for example, it reaches about 600 dpi, the jaggy appearing on the sloped part is not so conspicuous. However, if the recording density is doubled, quadruple memory is required, resulting in greatly enhancing the cost. To overcome this shortcoming, to enhance the image quality of the sloped part without having to increase the memory, for example, lot of techniques have been designed to improve the jaggy of the sloped part by reducing the diameter of one pixel and moving the pixel as disclosed in Japanese Patent laid-open Application 53-52019 or Japanese Patent laid-open Application 58-150978.

FIG. 39 shows an example of a printed sloped line where the diameter of each pixel is reduced. FIG. 40 shows an example of printed sloped line where each pixel is moved. The reduction of the diameter of each pixel can be changed at five stages by changing a pulse width (laser-radiating time) of the writing laser beam. The pixel is allowed to be moved within ±⅓ of the diameter by changing the writing timing (laser-radiating start time) of the laser beam.

In a case that the jaggy appearing on the sloped part is improved by reducing the diameter of each pixel or moving each pixel, it is difficult to control the radiation of a beam because it needs the five-stage change of the diameter or a complicated combination of moving ranges of pixels composing the sloped part. Further, since each of the pixels composing the sloped part is substantially elliptic, for outputting an enlarged character, it is disadvantageous that the jaggy appearing on the sloped part cannot be completely removed.

SUMMARY OF THE INVENTION

It is therefore an object of the invention to provide an image forming apparatus which can solve the foregoing disadvantages, that is, remove the jaggy appearing on the sloped part.

It is another object of the invention to provide an image forming apparatus which can change the form of each pixel on the sloped or curved part by properly controlling the pulse width of a writing laser.

These and other objects of the invention are achieved, in a first embodiment, by an image forming apparatus including an exposing means, for exposing the surface of a photosensitive body, and an exposure control means, for controlling the exposing operation of this exposing means, based on a picture signal indicating a character or a graphic to form, as a latent image, an image consisting of a plurality of pixels on the surface of the photosensitive body. The image forming apparatus takes the following measures.

That is, the exposure control means operates to divide the beam spot forming one pixel into a plurality of lighting times and a plurality of non-lighting times and properly take the combination of those lighting times and the non-lighting times for the purpose of making the distributing form, of the light energy for forming one pixel on the photosensitive body, substantially trapezoidal or rhomboidal.

According to the above arrangement of the invention, the light applied from the exposure means is divided into a plurality of lighting times and non-lighting times by the exposure control means. The distributing form, of the light energy forming one pixel on the photosensitive body, is made substantially trapezoidal and rhomboidal. This makes it possible to form each pixel, composing the latent image on the surface of the photosensitive body, as a substantially trapezoid or rhomboid shape having a sloped part. By representing the sloped part or the curve of the picture with the sloped part formed by the above means, it is possible to enhance the quality of the sloped part or the curve.

In a second embodiment of the invention including exposing means for exposing the surface of a photosensitive body and exposure control means for controlling an exposing operation of the exposing means based on a picture signal of a character or a graphic to form, as a latent image, a picture consisting of a plurality of pixels on the surface of the photosensitive body, the following measures are taken.

That is, the exposure control means operates to divide one light radiation for forming one pixel into a plurality of lighting times and non-lighting times. By properly combining these lighting times and non-lighting times, the form of a distribution of light energy needed to form one pixel on the photosensitive body is made to have a diagonal quarter area of one pixel adjacent to the pixel.

According to the above arrangements, the light radiation from the exposing means is divided into a plurality of lighting times and non-lighting times by the exposure control means so that the form of a distribution of light energy for forming one pixel on the photosensitive body is made to have a diagonal quarter area of one pixel adjacent to the pixel. Hence, the form of a pixel formed on the surface of the photosensitive body is made to contain a diagonal quarter area of the adjacent pixel. The pixel so formed provides a sloped portion. By properly locating such pixels, therefore, it is possible to enhance the image quality of a sloped portion or a curve on the printed picture.

In a third embodiment of the present invention including exposing means for scanning and exposing the surface of a photosensitive body rotating in the sub scanning direction in the main scanning direction perpendicular to the sub scanning direction and exposure control means for controlling an exposing operation of the exposing means based on a picture signal of a character or a graphic for the purpose of forming, as a latent image, a picture consisting of a plurality of pixels on the surface of the photosensitive body, the following measures are taken.

That is, the exposure control means operates to divide one light radiation for forming one pixel into a plurality of lighting times and non-lighting times. By properly combining these lighting times and non-lighting times, the form of a distribution of light energy needed to form one pixel is made to contain a diagonal quarter area of one pixel adjacent to the pixel in the main scanning direction or the sub scanning direction. At a time, the pixel containing a diagonal quarter area of one pixel adjacent to the pixel in the main scanning direction, formed by the light energy, and the pixel containing a diagonal quarter area of one pixel adjacent to the pixel in the sub scanning direction, formed by the light energy, are located in a manner to allow both of the quarter areas to come into contact with each other. On the portion where both of the pixels are adjacent, a diagonal half area made of both of the quarter areas is formed.

According to the above arrangements, the pixel containing a diagonal quarter area of the adjacent pixel is divided into two types, that is, the pixel containing a diagonal quarter area of the adjacent pixel in the main scanning direction and the pixel containing a diagonal quarter area of the adjacent pixel in the sub scanning direction. By properly locating these two kinds of pixels in a manner to allow both of the quarter areas to come into contact with each other, on the overlapped portion, a diagonal half area made of these two quarter areas are formed. As such, by representing the sloped portion or the curve of a picture by means of the diagonal half area, it is possible to enhance the image quality of the slope or the curve.

In the first to third embodiments, the exposing means may be arranged to have an LED array composed of luminous elements ranged along the width of the photosensitive body.

According to the above arrangement of the invention, the exposure means, whose light radiation is divided into a plurality of lighting times and non-lighting times, is composed of an LED array consisting of a plurality of ranged luminous elements. With this arrangement, this exposure means serves to form the trapezoidal pixel whose four sides are obvious on the printed image.

Further, to achieve the foregoing objects, a fourth embodiment provides an LED array composed of a plurality of luminous elements ranged in an array format and operates to form, as a latent image, a picture consisting of a plurality of pixels on the surface of the photosensitive body in accordance with the light corresponding to the picture signal sent from the LED array. The image forming apparatus takes the following measures.

That is, an optical lens system is provided adjacent a plurality of luminous elements composing the LED array, the optics system serving to spread out the distribution of the light downwardly.

According to the arrangement of the invention, a lens optical system is provided adjacent each luminous element composing the LED array, the optics system serving to spread out its beam downwardly. As such, the distributing form of light energy forming one pixel on the photosensitive body, is made substantially trapezoidal. This makes it possible to improve the image quality of the sloped part or the curve without having to provide a complicated mechanism for controlling the exposure.

A fifth embodiment provides an LED array consisting of a plurality of luminous elements ranged in an array format and operates to form, as a latent image, a picture consisting of a plurality of pixels on the surface of the photosensitive body. The image forming apparatus takes the following measures.

That is, the plurality of luminous elements composing the LED array are arranged in a triangular manner and the overall outer form of the luminous elements are made substantially trapezoidal or parallelogrammic in a manner that one row ranged in one row are directed reversely to those elements ranged in the adjacent rows.

According to the fifth embodiment of the invention, the luminous elements composing the LED array are arranged like a triangle and those luminous elements ranged in one row are directed reversely to the luminous elements ranged in the adjacent rows. This allows the overall outer form to be substantially trapezoidal or parallelogramatic. As such, the form of each pixel forming a latent image on the surface of the photosensitive body is made to be a substantially home-base type without having to provide a special means for controlling the exposure. By representing the sloped part or the curve of the picture with the sloped part, it is possible to enhance the quality of the sloped part or the curve.

Further objects and advantages of the present invention will be apparent from the following description of the preferred embodiments of the invention, as illustrated in the accompanying drawings.

BRIEF DESCRIPTION OF THE DRAWINGS

FIGS. 3(a), (b), (c), (d) and (e) are explanatory views showing each pulse waveform of a transfer clock, a frequency clock and clock horizontal synchronous signals CLKH1, CLKH2 and CLKH3.

FIGS. 11(a), (b), (c), (d) and (e) are plane views showing pixel dispositions arranged by the conventional laser printer, in which FIG. 11(a) shows a horizontal line.

FIGS. 12 (a), (b) and (c) are plane views showing pixel dispositions arranged by the laser printer of this embodiment, in which

FIGS. 30 (a), (b), (c), (d) and (e) are plane views showing pixel dispositions arranged by the conventional LED printer, in which

FIGS. 31(a), (b) and (c) are plane views showing pixel dispositions arranged by the LED printer of this embodiment, in which FIG. 31(a) shows a sloped line approximating to a horizontal line.

FIGS. 36(a), (b), (c), (d) and (e) are plane views showing pixel dispositions arranged by the LED printer of this embodiment, in which FIG. 36(a) shows a horizontal line.

DESCRIPTION OF THE PREFERRED EMBODIMENTS

Embodiment 1

An embodiment of the invention will be described below, referring to FIGS. 1 to 14(a), 14(b) and 14(c). According to this embodiment, the image forming apparatus is illustrated as a laser printer having a low recording density per about 300 dpi (dot per inch).

Figure 1:
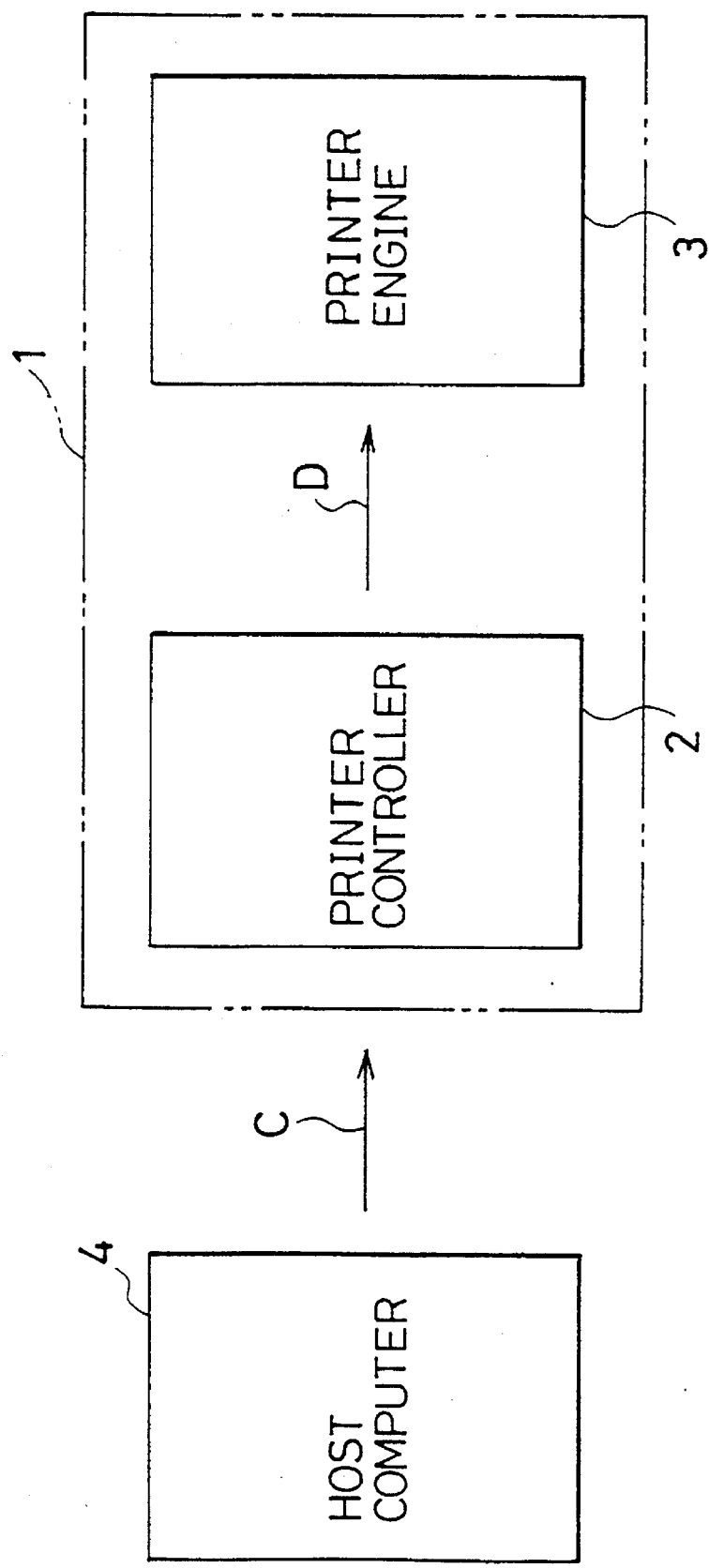
FIG. 1 is an explanatory view showing an outline of a laser printer according to an embodiment of the invention.

The laser printer 1 according to this embodiment, as shown in FIG. 1, provides a printer controller 2 served as an exposure control means for generating page information consisting of dot data D based on code data C transmitted from an external host computer 4 and a printer engine section 3 served as an exposing means for creating an image on a non-shown photosensitive body based on dot data D transmitted from the printer controller 2.

Figure 2:
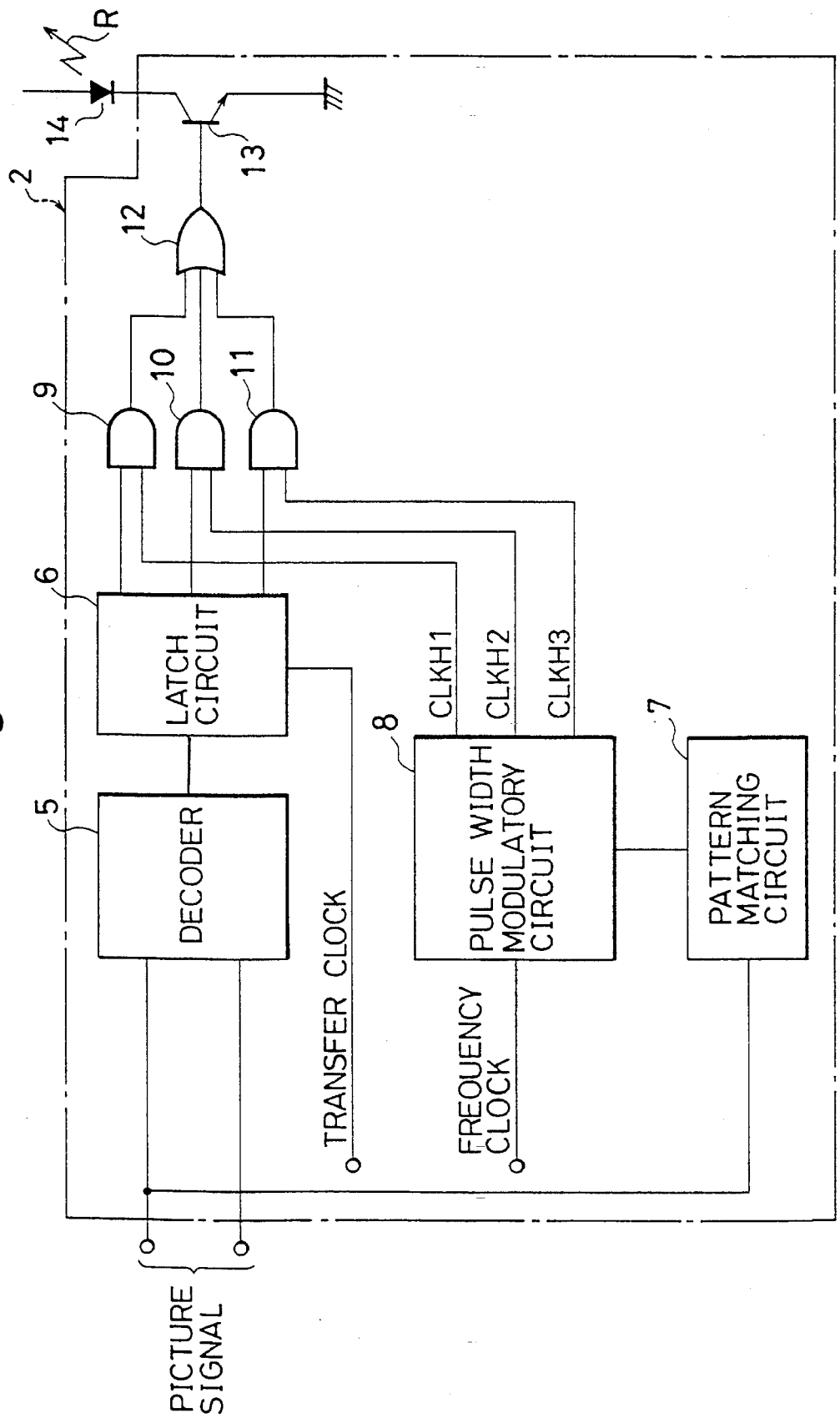
FIG. 2 is a circuit diagram showing each of components composing a printer controller included in the laser printer.

The printer controller 2 is, as shown in FIG. 2, arranged to have a decoder 5, a latch circuit 6, a pattern matching circuit 7, a pulse width modulating circuit 8, AND gates 9, 10, 11, an OR gate 12 and a transistor 13. The decoder 8 serves to convert the number of bits composing a picture signal of a character and a graphic transmitted from the host computer 4 into the data for an optical printer and output it to the latch circuit 6. The latch circuit 6 serves to latch the picture signal input from the decoder 5 by entering a delay line into a transfer clock shown in FIG. 3(a). The latched picture signal is output to each of the AND gates 9, 10 and 11. On the other hand, the pattern matching circuit 7 performs a pattern-matching treatment to be described later with respect to the picture signal of a character and a graphic transmitted from the host computer 4 or the like for identifying and detecting a curve and a sloped part of the character and the graphic and outputs the data about the curve and the sloped part to the pulse width modulating circuit 8. The pulse width modulating circuit 8 serves to modulate a pulse width of a frequency clock as shown in FIG. 3(b) based on the information input from the pattern matching circuit 7 and then output the clock horizontal synchronous signals CLKH1, CLKH2 and CLKH3 as shown in FIGS. 3 (c), (d) and (e) to the corresponding AND gates 9, 10 and 11.

The AND gates 9, 10 and 11 serve to multiply the picture signal, about the character and the graphic latched by the latch circuit 6, by the clock horizontal synchronous signals CLKH1, CLKH2 and CLKH3 sent from the pulse width modulating circuit 8, respectively. The pulse-width-modulated picture signal about the character and the graphics is output to the transistor 13 through the OR gate 12. The transistor 13 serves to output those signals to the semiconductor laser 14 serving as the printer engine section 3.

Then, the pulse-width-modulated picture signal about the character and the graphic is converted into a laser beam R in the semiconductor laser 14. The laser beam R is deflectively scanned by the rotary polygonal mirror or the like (not shown) and then is applied to the photosensitive body being rotated. At a time, the light energy is supplied on the surface of the photosensitive body where the laser beam R is applied. The supply of the light energy results in forming a picture consisting of a plurality of pixels as an electrostatic latent image. After that, the latent image is developed, transferred and fixed and then printed on the recording sheet of paper. In addition, the direction of scanning done by the above rotary polygonal mirror is referred to as a "main scanning" direction, and the rotating direction of the photosensitive body, that is, the feeding direction of the recording paper is referred to as a "sub scanning" direction. The rotary speed of the photosensitive body is far lower than the rotary speed of the rotary polygonal mirror and thereby may be neglected.

By the way, the pulse width T0, of each of the clock horizontal synchronous signals CLKH1 and CLKH2 output from the pulse width modulating circuit 8, is divided into six. During each time t1 to t6, the semiconductor laser 14 is switched on, while at each time S1 to S5, the semiconductor laser 14 is switched off. That is, each of times t2 to t6 correspond to the lighting times of the laser beam R and each of times S1 to S5 correspond to the non-lighting times of the laser beam R.

Figure 4A:
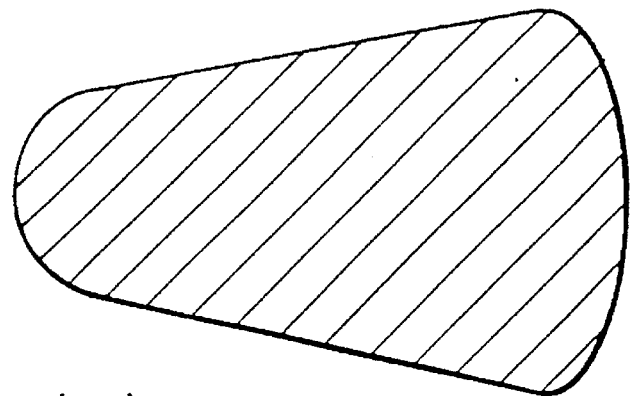
FIGS. 4(a), (b) and (c) are explanatory views showing each form of light energy distributions formed by the clock horizontal synchronous signals CLKH1, CLKH2 and CLKH3.
Figure 4B:
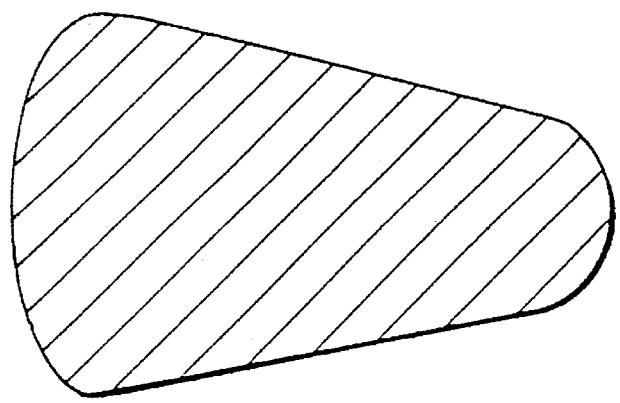
Figure 4C:
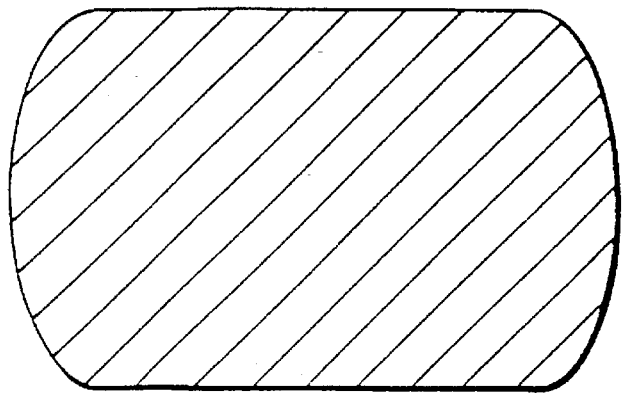

Hence, in the clock horizontal synchronous signal CLKH1 which is made progressively longer as the lighting time of the laser beam R forming one pixel is going toward the later half part of the time, the distribution of light energy of the laser beam R forming one pixel is made to have a substantially trapezoidal form spreading out downwardly as shown in FIG. 4(a). Hence, the form of one pixel is allowed to have a substantially trapezoidal form spreading out downwardly. On the other hand, in the clock horizontal synchronous signal CLKH2 where the non-lighting time of the laser beam R is made progressively shorter as the time is going toward the later half part of the time, the distribution of light energy of a laser beam R forming one pixel is made to have a substantially trapezoidal form being reverse to the above form as shown in FIG. 4(b). As such, the form of one pixel is allowed to have a substantially trapezoidal form as shown in FIG. 4(b). With respect to the clock horizontal synchronous signal CLKH3, the pulse width T0 of the signal is not divided so that the semiconductor laser 14 may be continuously operative. Hence, the distribution of light energy of the laser beam R forming one pixel is allowed to have a substantially elliptical form as shown in FIG. 4(c). Further, the substantially trapezoidal distribution of light energy formed by controlling the application of the laser beam R is formed according to a constant scanning speed, a constant laser output and a constant laser diameter.

Next, the description will be oriented to an example of pattern matching done by the pattern matching circuit 7 for identifying and detecting a curve and a sloped part of a character or a graphic.

Figure 5:
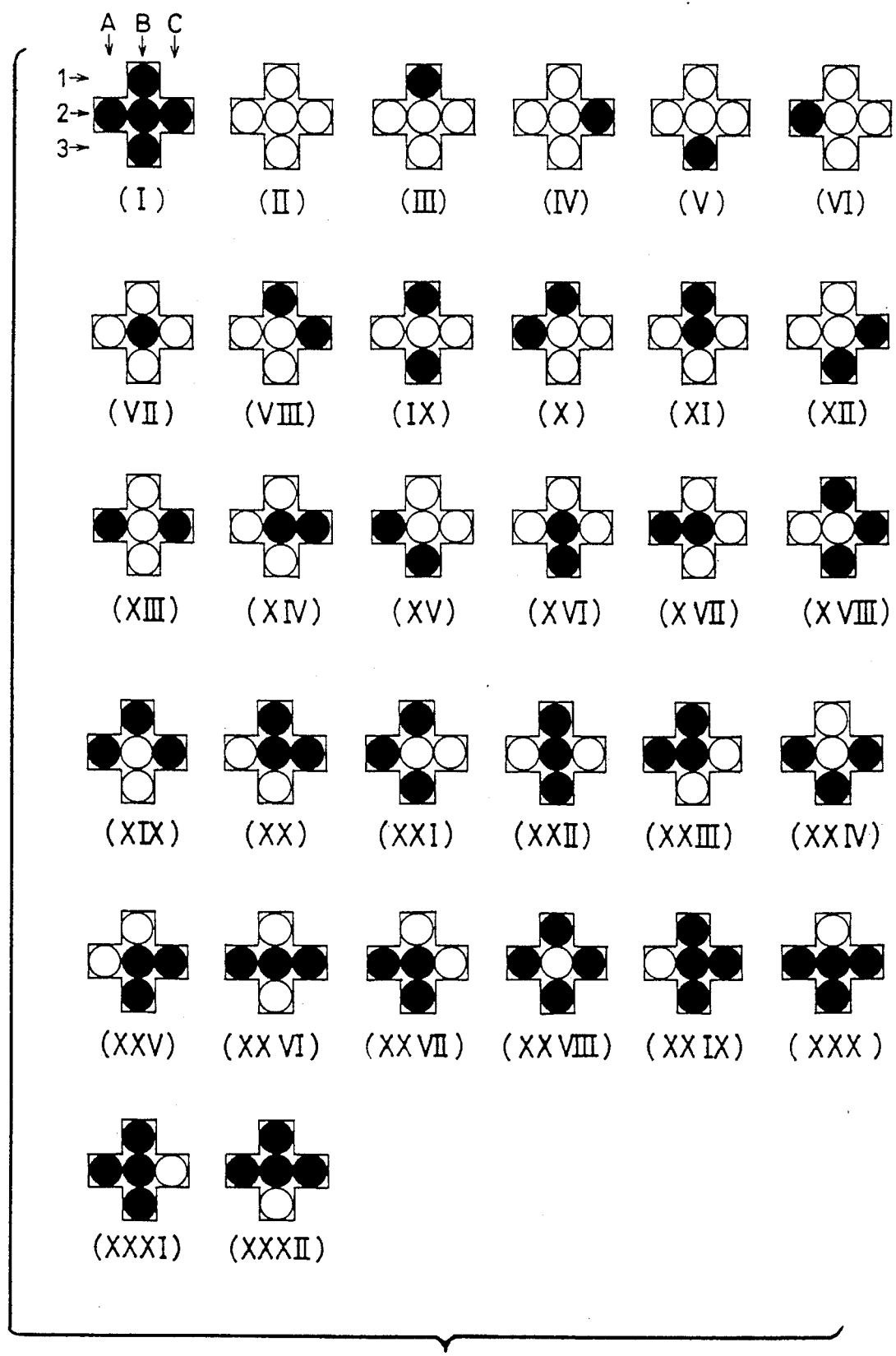
FIG. 5 is an explanatory view showing 32 kinds of memory patterns, (Roman I–XXXII), each composed of five pixels used for pattern matching.

As shown in FIG. 5, inside of the laser printer 1, a cross pattern for pattern matching (referred to as a memory pattern) is stored. The memory pattern consists of five pixels. This memory pattern is divided into 32 types as shown FIGS. 5(i) to 5(xxxii) depending on whether each of the five pixels forms dot (pixel to be printed, that is, black dot shown in FIG. 5) or not (pixel not to be printed, that is, white dot shown in FIG. 5).

To those five pixels composing a cross, A, B and C, addresses are given in the sequence of the main scanning (rightward in FIG. 5) of the laser beam R and 1, 2 and 3 addresses are given in the sequence of the sub scanning (downward in FIG. 5). When the pixel at the address A2 forms one dot, it is represented by A2. When it does not form one dot, it is represented by (A2). In representing the memory pattern with a character formula, for example, if all the five pixels form dots (FIG. 5(i)), the memory pattern is represented by A2B1B2B3C2. If none of the five pixels form dots (FIG. 5(ii)), the memory pattern is represented by (A2) (B1) (B2) (B3) (C2).

Figure 6:
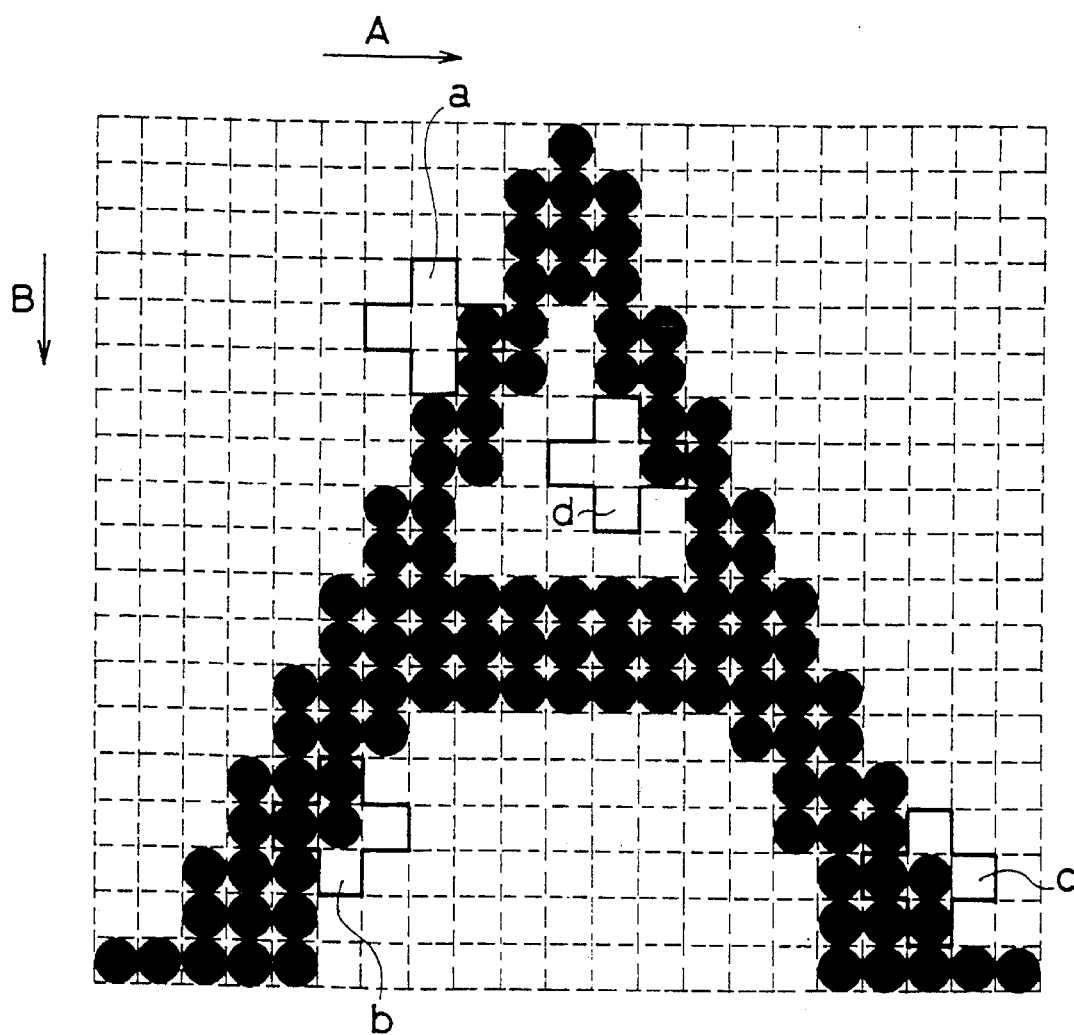
FIG. 6 is an explanatory view showing the state where the same cross as the memory pattern is fitted to a graphic pattern for performing the pattern matching.

Next, the picture signal of the character or the graphic to be printed, the signal being input from the external host computer 4, is compared with the memory pattern for considering the picture signal. For that purpose, as shown in FIG. 6, the same cross as the memory pattern is fitted to the graphic pattern. By checking the dot dispositions of the five pixels, each possible dot disposition of these five pixels matches some one of the 32 memory patterns.

At a time, to fit the same cross as the memory pattern to the graphic pattern, the cross is moved one pixel by one pixel in the main scanning direction A from the start point where the laser beam R of the graphic pattern is scanned (upper left corner shown in FIG. 6). Then, after the cross is moved by one pixel in the sub scanning direction B, likewise, the cross is moved one pixel by one pixel in the main scanning direction A for fitting the cross to the graphic pattern. Finally, the cross is moved one pixel by one pixel toward the end point where the laser beam R is scanned (lower right corner shown in FIG. 6) for performing the fitting.

With respect to the graphic pattern of the part where a cross is fitted by the above operation, the memory pattern matching to the graphic pattern of the each cross-fitted part is compared with the memory pattern matching to the cross-fitted part immediately after the cross is moved by one pixel in the main scanning direction A.

Figure 7:
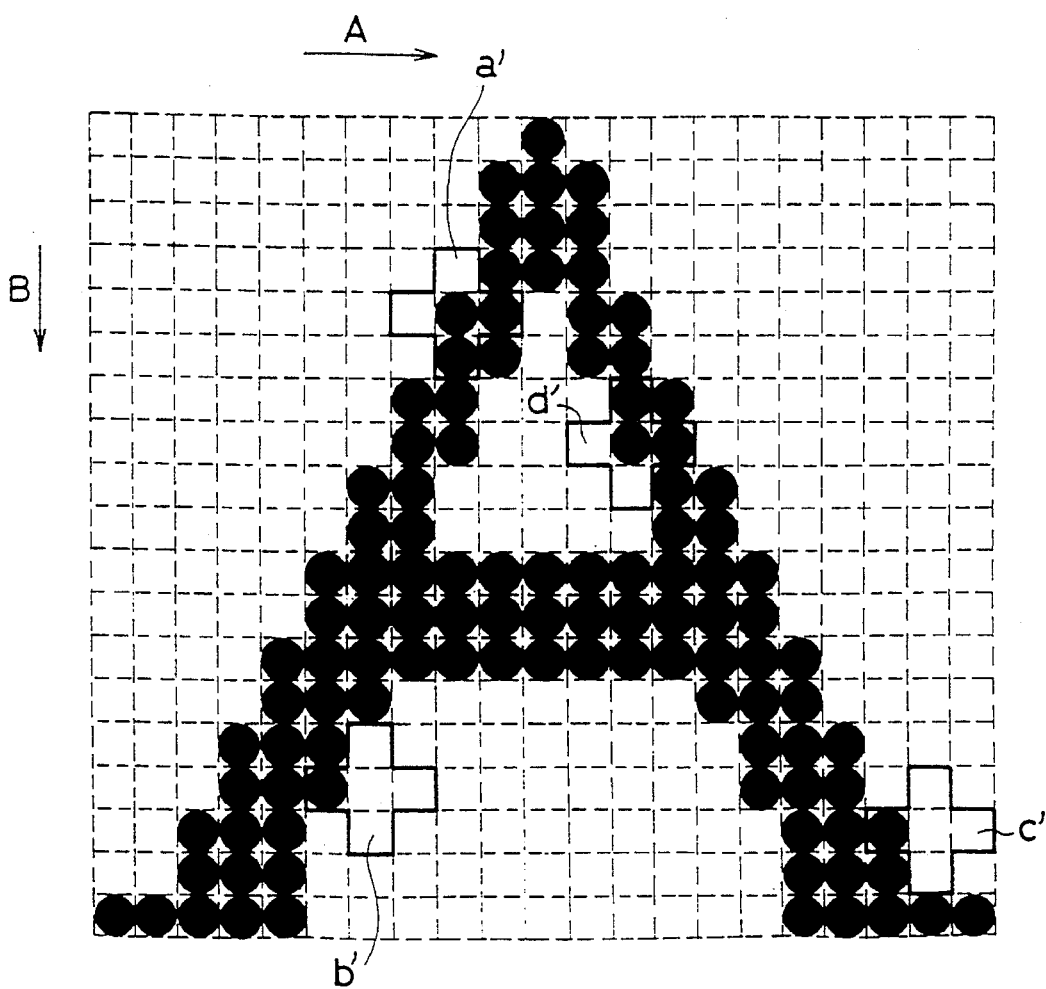
FIG. 7 is an explanatory view showing the state where the same cross as the memory pattern is fitted to a graphic pattern for performing the pattern matching.
Figure 8A:
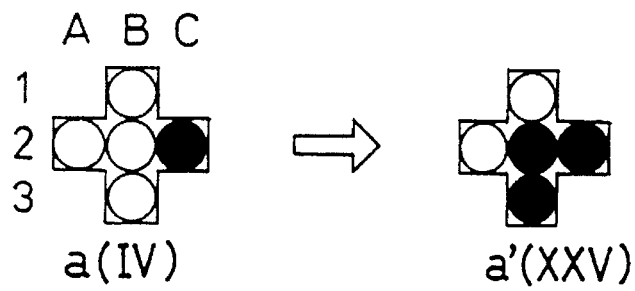
FIGS. 8 (a)–(d) are explanatory views showing a method for identifying and detecting a curve portion or a sloped line portion of a character or a graphic by performing the pattern matching.
Figure 8B:
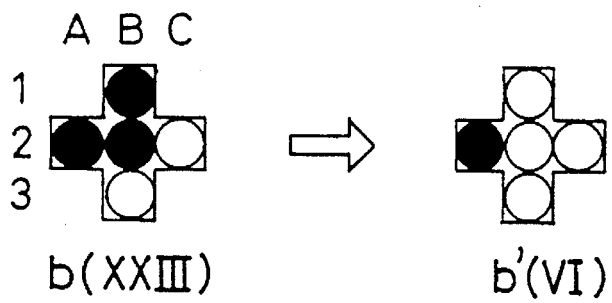
Figure 8C:
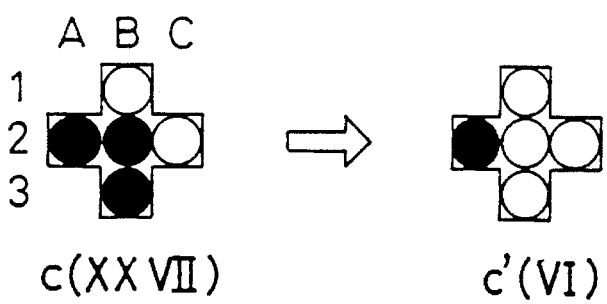
Figure 8D:
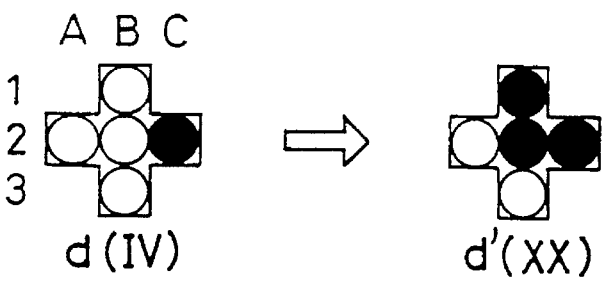

That is, the memory pattern matching to the graphic pattern of the cross-fitted part (a, b, c, d shown in FIG. 6) as shown in FIG. 6 is compared with the memory pattern matching to the graphic pattern of the cross-fitted part immediately after the cross is moved by one pixel in the main scanning direction as shown in FIG. 7 for identifying the change of a dot disposition of the five pixels so that the border is detected between the curve and the sloped part of a character or a graphic to be printed and an empty portion of no graphic or character to be printed.

By the way, considering the relation between the curve and the sloped part of a character or a graphic to be printed and an empty portion with no character or graphic to be printed around the curve or the sloped part, the relation may be divided into the following four types.

(1) The border is directed right upward and the character or graphic is located below (a of FIG. 6).

(2) The border is directed right upward and the character or graphic is located above (b of FIG. 6).

(3) The border is directed right downward and the character or graphic is located below (c of FIG. 6).

(4) The border is directed right downward and the character or graphic is located above (d of FIG. 6).

With respect to these four cases, the memory pattern matching to the cross-fitted graphic pattern (a, b, c and d of FIG. 6) as shown in FIG. 6 is compared with the memory pattern matching to the cross-fitted graphic pattern immediately after it is moved by one pixel in the main scanning direction A (a', b', c' and d' of FIG. 7) as shown in FIG. 7. As such, the change of dot dispositions of these five pixels represented by the character formula is as follows.

For the case of (1), the character formula (A2) (B1) (B2) (B3)C2 is changed to (A2) (B1)B2B3C2. That is, the dot disposition of these five pixels are changed from (iv) to (xxv) of FIG. 5.

For the case of (2), the character formula A2B1B2(B3) (C2) is changed to A2(B1) (B2) (B3) (C2). That is, the dot disposition of the five pixels is changed from (xxiii) to (vi) of FIG. 5.

For the case of (3), the character formula A2(B1)B2B3(C2) is changed to A2(B1) (B2) (B3) (C2). That is, the dot disposition of the five pixels is changed from (xxvii) to (vi) of FIG. 5.

For the case of (4), the character formula (A2) (B1) (B2) (B3) C2 into (A2) B1B2(B3)C2. That is, the dot disposition of the five pixels is changed from (iv) to (xx) of FIG. 5.

Hence, to sense the curve and the sloped part of a character or graphic to be printed, as shown in FIG. 8, it is just necessary to identify the change of the dot disposition of the five pixels with respect to the above four cases.

In the case of the change of the dot disposition of the five pixels represented by the cases (1) and (4), the foregoing clock horizontal synchronous signal CLKH1 serves to control the application of the laser beam R into C2 of the pixel inside of the graphic pattern (a, d of FIG. 6) of the cross-fitted part, that is, B2 of a pixel inside of a graphic pattern (a', d' of FIG. 7) of a cross-fitted part immediately after it is moved by one pixel in the main scanning direction A. This results in being able to form the substantially trapezoidal dots spreading out downwardly as shown in FIG. 4(a).

Likewise, in the case of the change of the dot disposition of the five pixels represented by the cases (2) and 93), the clock horizontal synchronous signal CLKH2 serves to control the application of the laser beam R to B2 of the pixel inside of the graphic pattern (b, c of FIG. 6) of the cross-fitted part, that is, C2 of the pixel inside of the graphic pattern (b', c' of FIG. 7) of the cross-fitted part immediately after the cross is moved by one pixel in the main scanning direction A. This results in being able to form a substantially trapezoidal dots spreading out upwardly.

Figure 9:
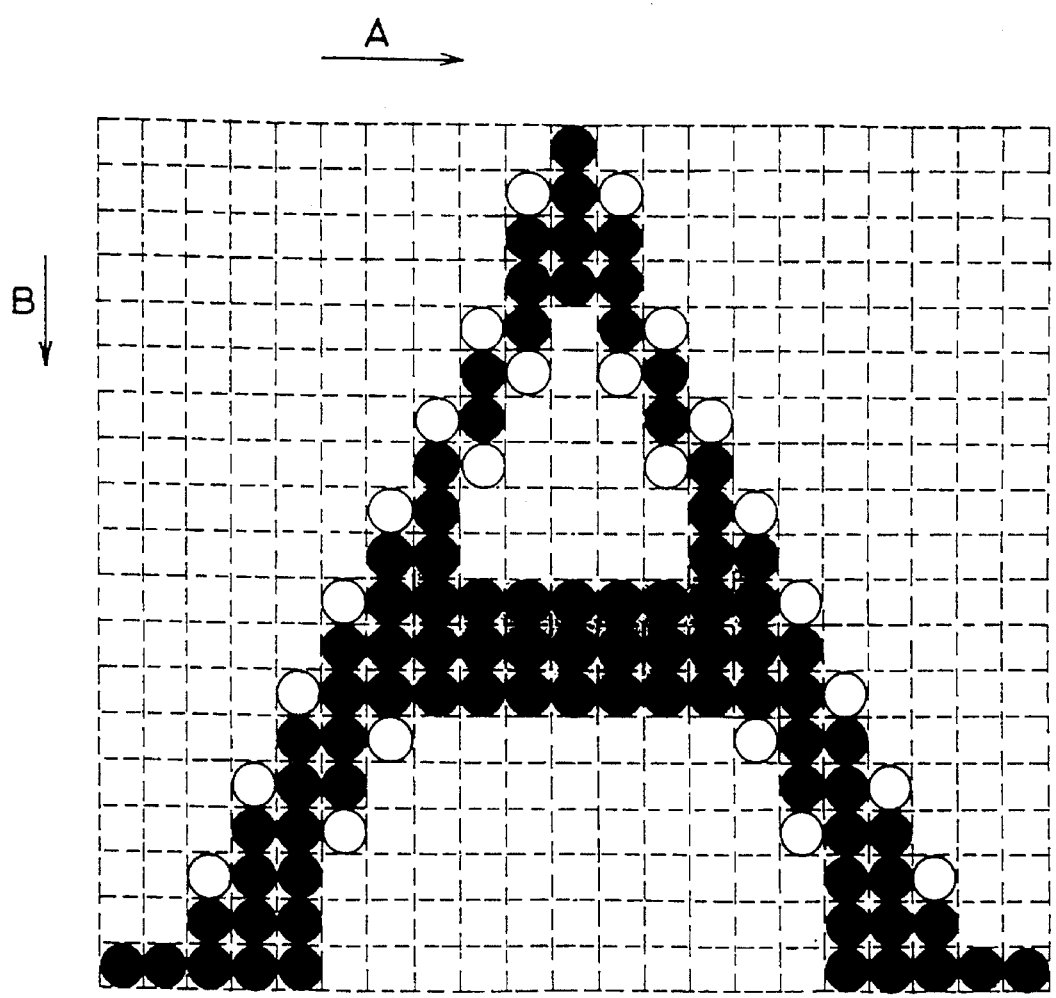
FIG. 9 is an explanatory view showing the state where the curve portion or the sloped line of a character or a graphic is identified or sensed from the graphic pattern.
Figure 10:
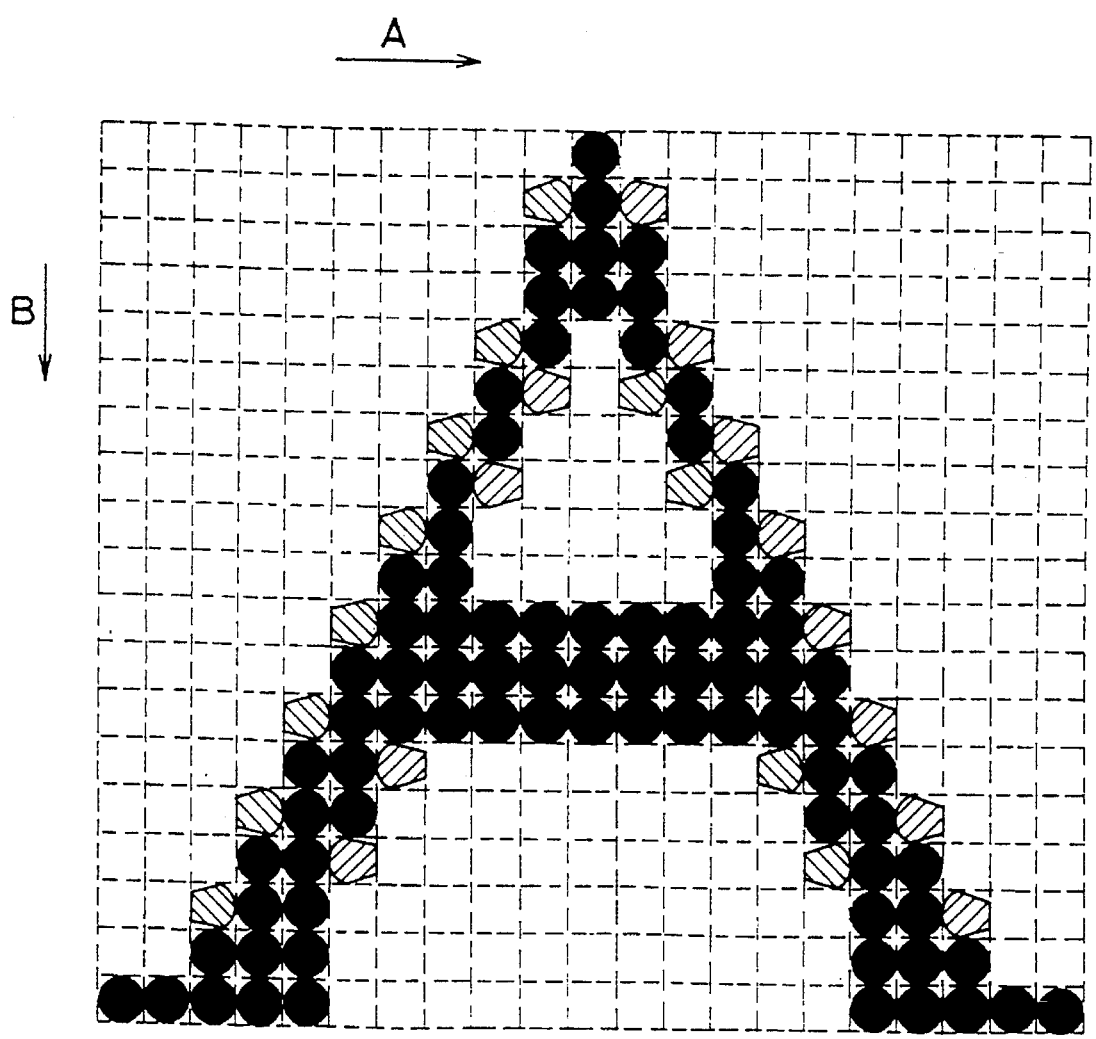
FIG. 10 is an explanatory view showing the state where substantially trapezoidal dots are printed on the graphic pattern.

As such, the pixels on the curve or the sloped part of a character or a graphic, as shown by a white dot of FIG. 9, are identified and detected by means of the pattern matching. Then, with the control of the application of the laser beam R as described above, the substantially trapezoidal dots spreading out downwardly or upwardly as shown in FIG. 10 are printed. The above-mentioned pattern matching is a mere example. If various forms of memory patterns are stored in the laser printer 1, more variable pattern matching can be performed.

Next, the laser printer 1 according to this embodiment is compared with the conventional laser printer having a recording density of 300 dpi or some in light of a printed line. The horizontal and vertical lines printed by the laser printer 1 are the same as those printed by the conventional laser printer.

Figure 11A:
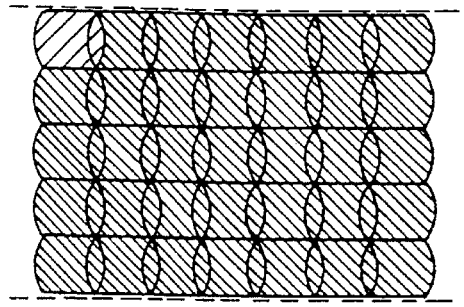
Figure 11B:
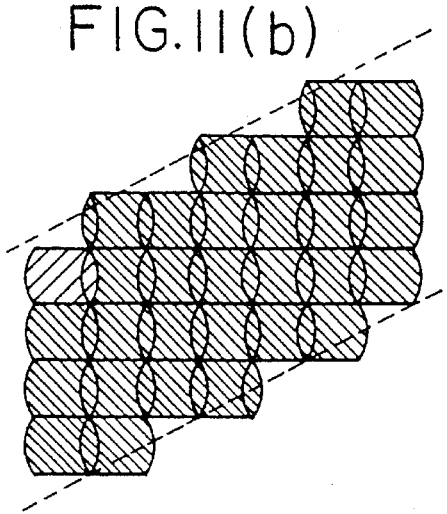
FIG. 11(b) shows a sloped line approximating to a horizontal line.
Figure 11C:
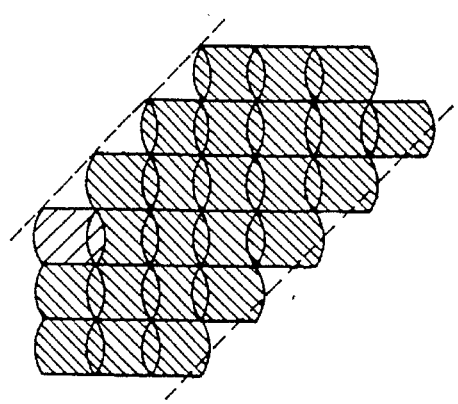
FIG. 11(c) shows a line sloped at 45×, FIG. 11 (d) shows a sloped line approximating to a vertical line, and FIG. 11 (e) shows a vertical line.
Figure 11D:
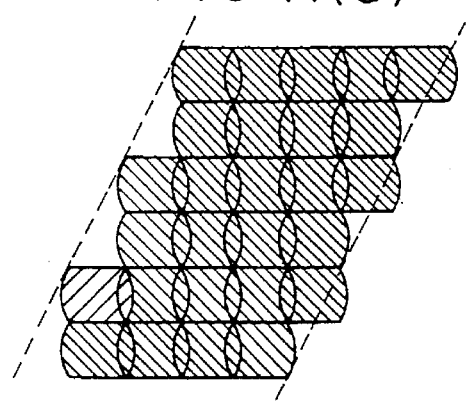
Figure 11E:
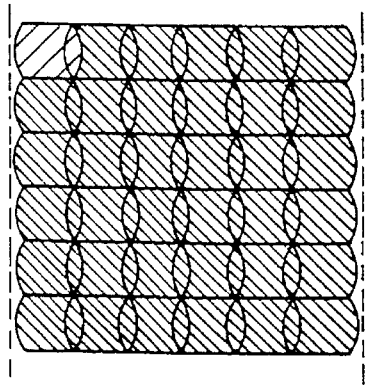

The line printed by the conventional laser printer is formed of pixels each of which is substantially elliptic as shown in FIGS. 11(a) to (e). Hence, except the horizontal line shown in FIG. 11(a) and the vertical line shown in FIG. 11(e), for all the other lines such as a sloped line approximating to the horizontal line shown in FIG. 11(b), a line sloped at an angle of slope of 45° as shown in FIG. 11(c), and a sloped line approximating to the vertical line as shown in FIG. 11(d), a stepwise jaggy takes place between the vertical pixels, resulting in impairing the smoothness of the line.

Figure 12A:
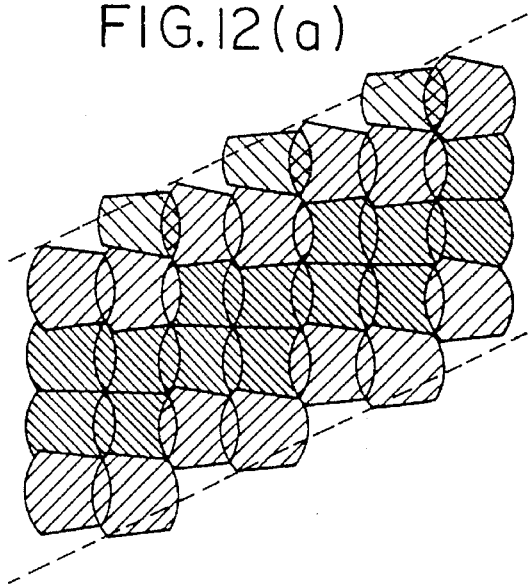
FIG. 12(a) shows a sloped line approximating to a horizontal line, FIG. 12 (b) shows a line sloped at 45×, and FIG. 12 (c) shows a vertical line.
Figure 12B:
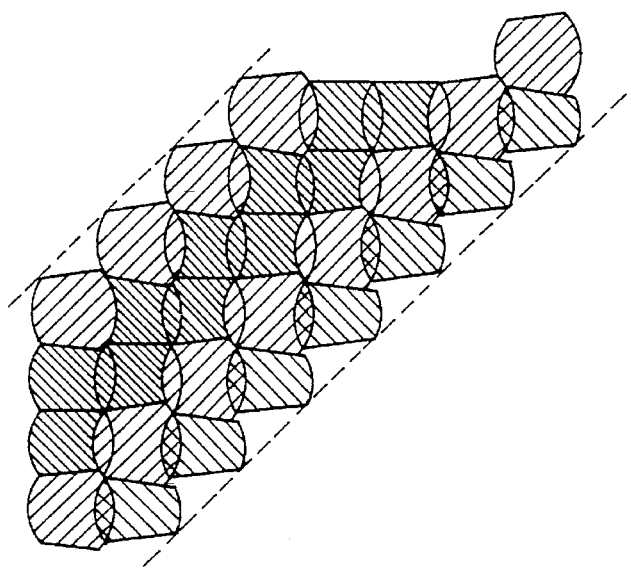
Figure 12C:
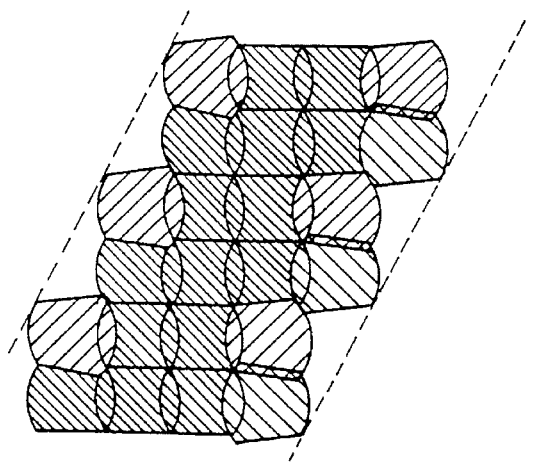

On the other hand, for any kind of sloped lines printed by the laser printer 1 of this invention such as a sloped line approximating to the horizontal line as shown in FIG. 12(a), a sloped line at an angle of slope of 45° as shown in FIG. 12(b) and a sloped line approximating to the vertical line as shown in FIG. 12(c), substantially trapezoidal pixels are formed on both width ends of the line so that the sloped edges of the trapezoidal form may represent the sloped portion of the line to be printed. Hence, from a view of micro observation, it does not represent a completely smooth sloped portion. However, the jaggy of the line printed by the conventional laser printer is formed to have a substantially right angle at the jaggy step, while the laser printer 1 of this invention is formed to have a jaggy which is formed to have not a right angle but a slope approximating to the angle of a sloped line to be drawn. Further, the area of an empty portion to be essentially formed by a black pixel is made smaller than that caused by the conventional laser printer. Therefore, the quality of the sloped portion printed by the laser printer of this invention is further improved relative to that printed by the conventional laser printer.

Figure 13B:
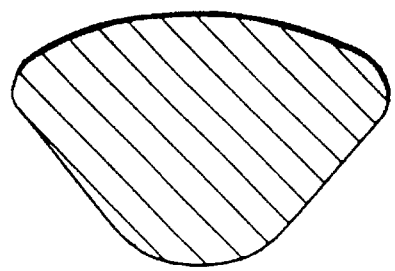
FIGS. 13 (a) to 13 (f) are explanatory views showing respective forms of light energy distributions formed under variable light-radiating conditions.
Figure 13C:
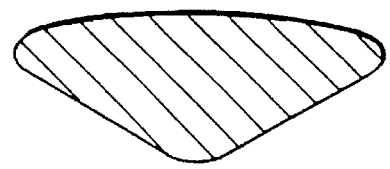
Figure 13A:
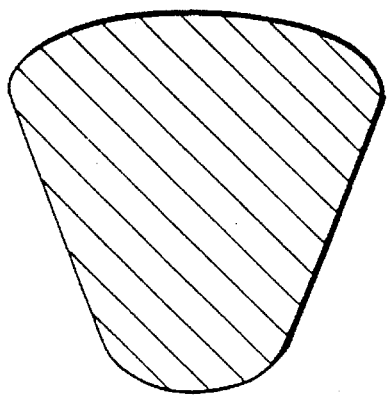
Figure 13F:
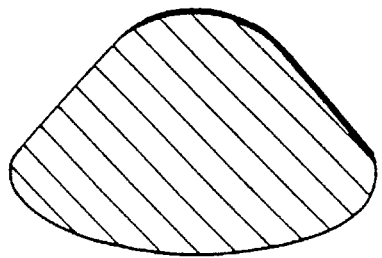
Figure 13E:
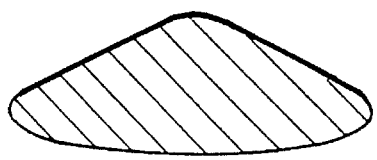
Figure 13D:
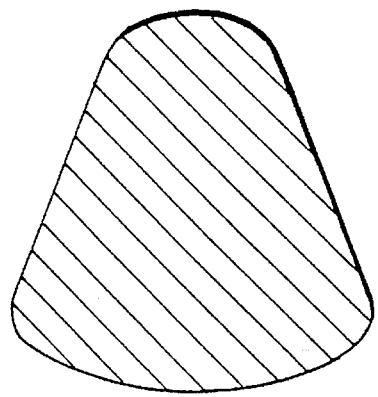
Figure 14C:
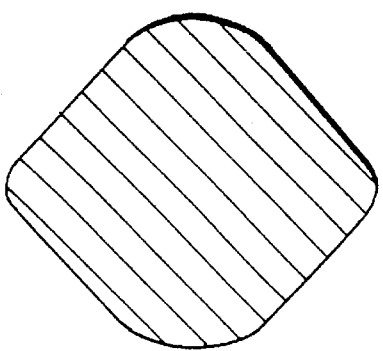
FIGS. 14 (a), (b) and (c) are explanatory views showing respective forms of substantially rhomboidal distributions of light energy formed by proper combinations of light energy distributions each having a trapezoidal form spreading out downwardly or upwardly.
Figure 14B:
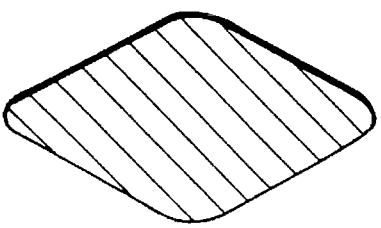
Figure 14A:
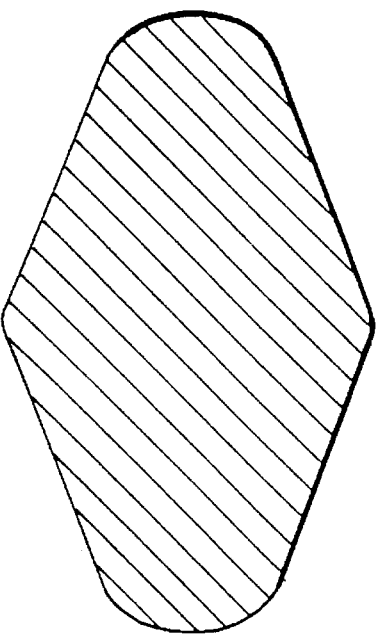
Figure 15:
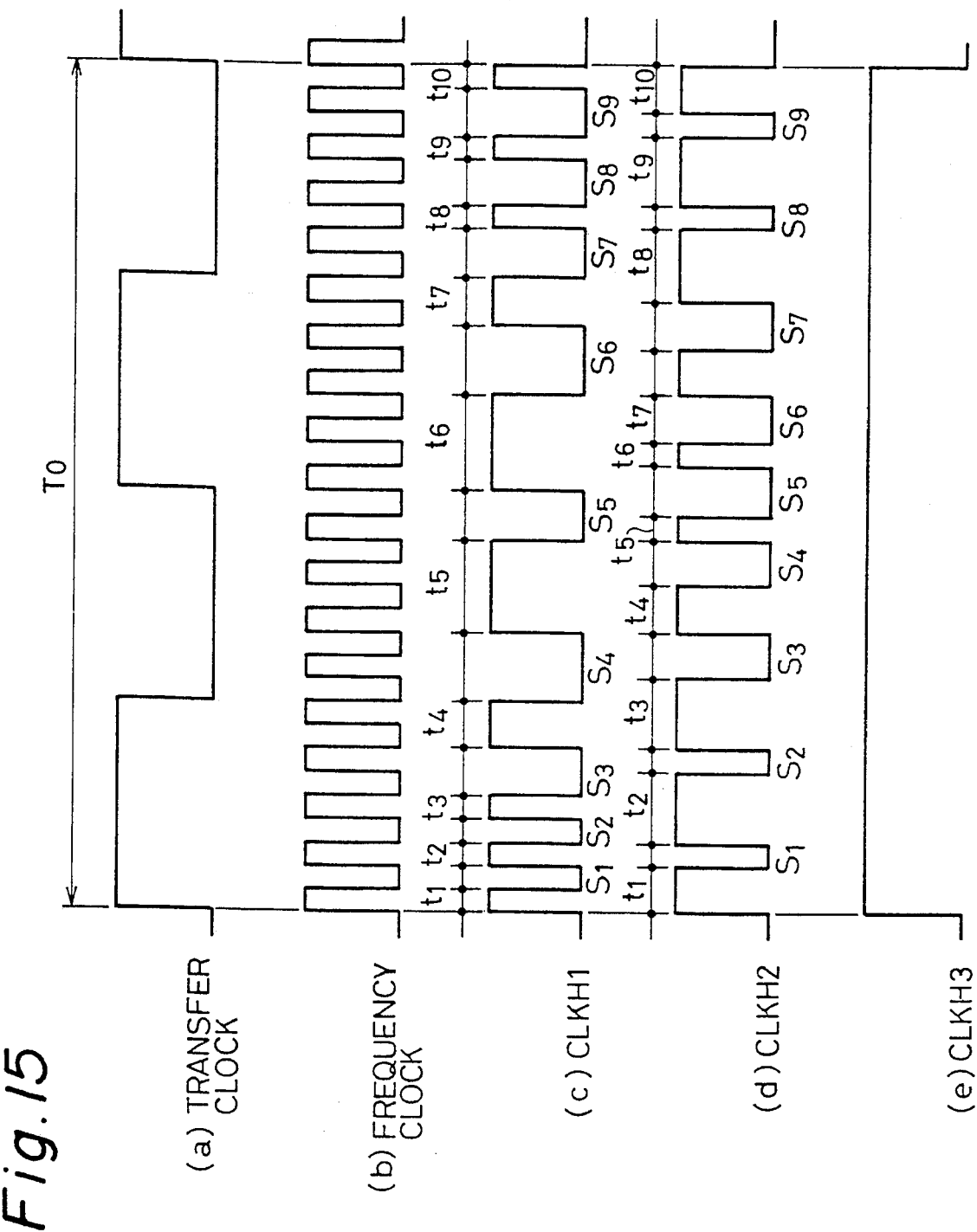
FIG. 15, including FIGS. 15 (a), (b), (c), (d) and (e), are explanatory views showing each pulse waveform of a transfer clock, a frequency clock and clock horizontal synchronous signals CLKH1, CLKH2 and CLKH3.

The foregoing embodiment does not define this invention. It may be varied within the scope of the invention. For example, the foregoing embodiment has been arranged to use the clock horizontal synchronous signals CLKH1 and CLKH2 formed by dividing the pulse width T0 for forming one pixel into six parts. However, the divisional number of the pulse width T0 is not limited to six. The concrete numerical values of each time t1 to t6 and S1 to S5 in the clock horizontal synchronous signals CLKH1 or CLKH2 may be variable according to the conditions of light radiation or the recording density. Hence, to form the substantially trapezoidal distribution of light energy spreading out downwardly or upwardly under each condition of light radiation, by properly adopting a value of each time t1 to t6 and S1 to S5, it is possible to adjust how much the lower side is spread. As shown in FIGS. 13(a) to 13(f), therefore, it is possible to form a trapezoid matching to such a sloped line as having a proper angle. Further, by combining the distribution of light energy as shown in FIG. 13(a) with the distribution of light energy as shown in FIG. 13(b), the distribution of light energy as shown in FIG. 13 (b) with the distribution of light energy as shown in FIG. 13(e), or the distribution of light energy as shown in FIG. 13(c) with the distribution of light energy as shown in FIG. 13(f), it is also possible to form a substantially rhomboidal distribution of light energy as shown in FIGS. 14(a), 14(b) and 14(c).

Embodiment 2

Another embodiment of this invention will be described below, referring to FIGS. 15 to 21. An image forming apparatus according to this embodiment is a laser printer having a construction as similar to that of the first embodiment. The difference between the preceding and present embodiments lies in the clock horizontal synchronous signals CLKH1 and CLKH2. In this embodiment, the clock horizontal synchronous signals CLKH1 and CLKH2 output from the pulse width modulating circuit 8 have the corresponding selective combination of the lighting times t1 to t10 and the non-lighting times s1 to s9 of the laser beam set for designing one pixel into a desired form as shown in FIGS. 18(c) and (d). That is, each of CLKH1 and CLKH2 provides a ten-divided pulse width T0 for forming one pixel. During each time t1 to t10, the semiconductor laser 14 is operated on, while during each time s1 to s9, the semiconductor laser 14 is operated off. These on/off times are set so that the distribution of light energy (pixels formed on the surface of the photosensitive body) formed by the laser beam R has a form as shown in FIGS. 16(a) and (b).

Figure 16A:
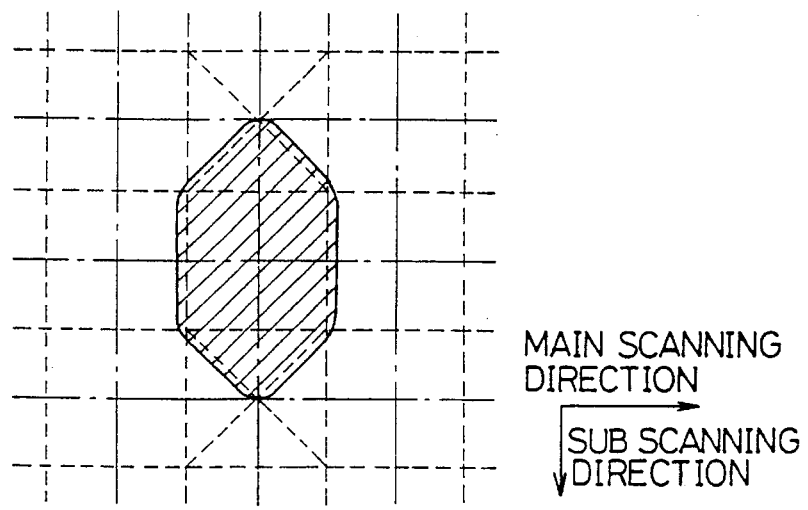
FIGS. 16 (a), (b) and (c) are explanatory views showing each form of light energy distributions formed by the clock horizontal synchronous signals CLKH1, CLKH2 and CLKH3.
Figure 16B:
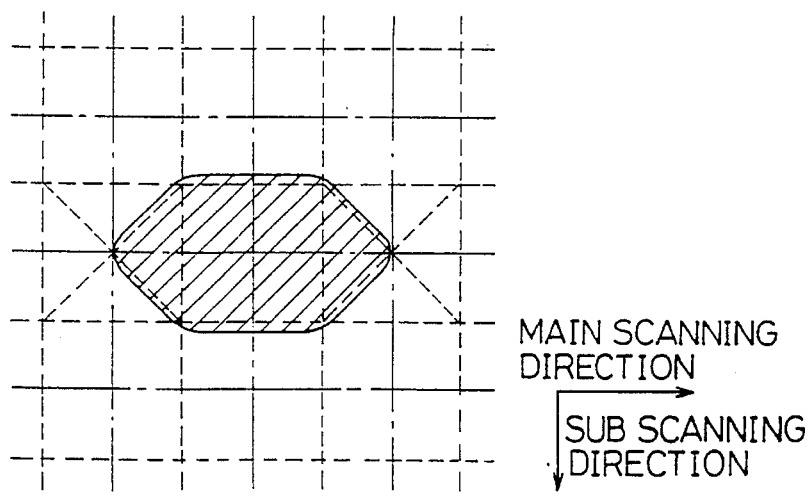

Hence, with respect to the clock horizontal synchronous signal CLKH1 divided as shown in FIG. 15(c), the light energy distribution of a laser beam R for forming one pixel is formed to contain a diagonal quarter area in the sub scanning direction of one pixel adjacent to both sub-scanning directional sides of the pixel as shown in FIG. 16(a).

With respect to the clock horizontal synchronous signal CLKH2 divided as shown in FIG. 15(d), the light energy distribution of the laser beam R for forming one pixel is formed to contain a diagonal quarter area in the main scanning direction of another pixel adjacent to both main scanning directional sides of the pixel.

Figure 16C:
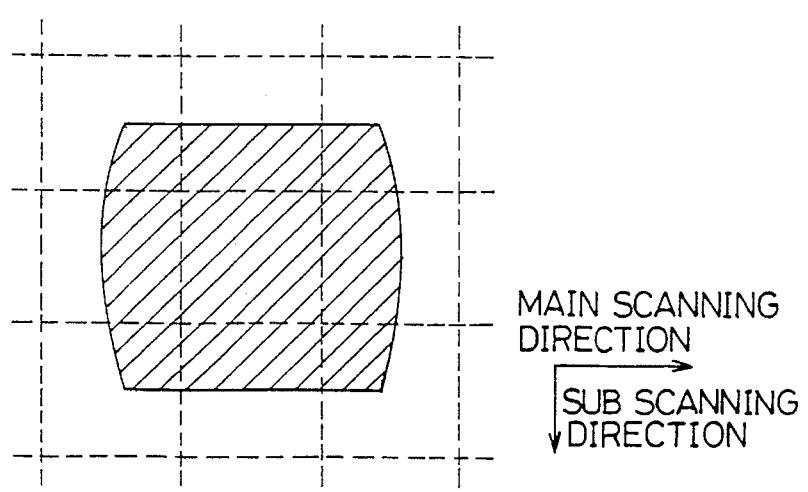

With the clock horizontal synchronous signal CLKH3 as shown in FIG. 15(e), the pulse width T0 is not divided so that the semiconductor laser is allowed to be continuously operated on. Hence, for this clock horizontal synchronous signal CLKH3, the light energy distribution of the laser beam R for forming one pixel is made to be substantially elliptical as shown in FIG. 16(c). However, the distribution shown in FIG. 16(c) is made substantially square for making the explanation easier. The light energy distribution formed by controlling radiation of the laser beam R is formed at a constant scanning speed, a constant laser output, and a constant laser diameter.

The description will be oriented to the pixel disposition for smoothly representing a sloped portion or a curve portion by using the pixels formed according to the light energy distribution as described above.

Figure 17A:
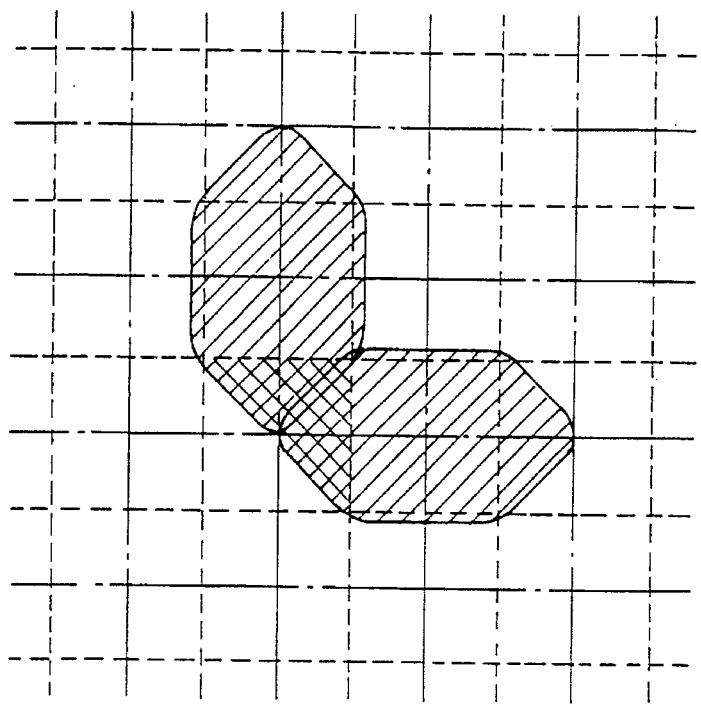
FIGS. 17 (a) and (b) are explanatory views showing a pixel disposition containing a substantially diagonal quarter area of an adjacent pixel formed by the energy distribution shown in FIGS. 16(a) and (b), respectively.
Figure 18:
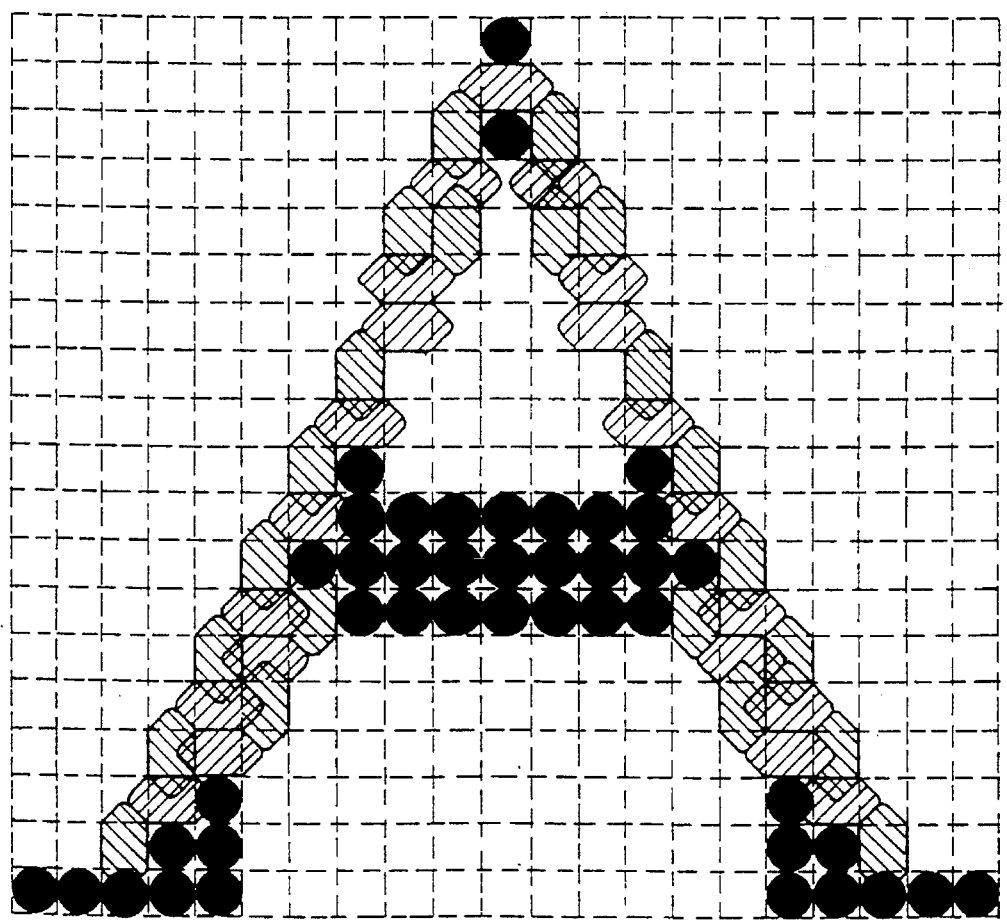
FIG. 18 is an explanatory view showing the state where printing is done by using the pixel disposition of this invention for the graphic pattern and an expanded plane view showing a character having consecutive substantially diagonal half pixels.

For example, as shown in FIG. 17(a), at a lower right side of the pixel formed by the clock horizontal synchronous signal CLKH1, the pixels formed in response to the clock horizontal synchronous signal CLKH2 are located so as to allow each of the adjacent diagonal quarter areas to be adjacent to each other. By this location, at an upper left portion of the portion adjacent to both of the pixels, it is possible to form a diagonal half pixel.

Figure 17B:
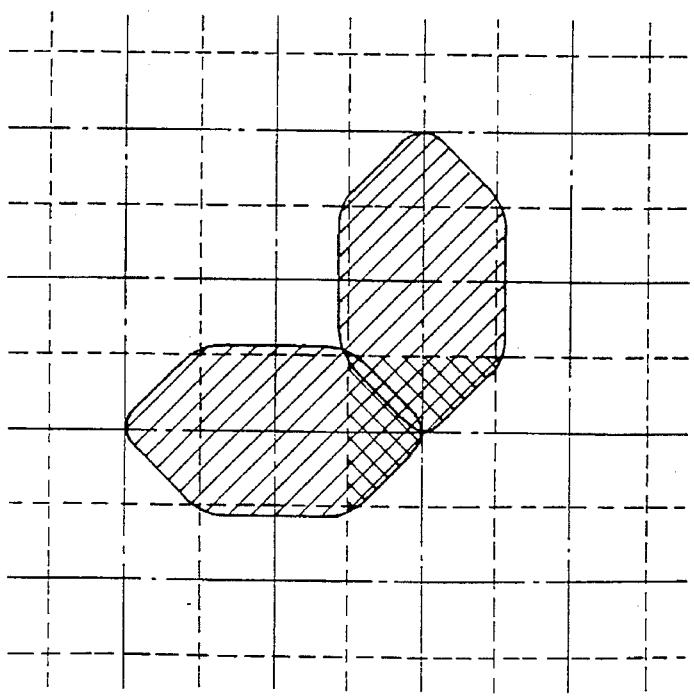

As shown in FIG. 17(b), at the lower left side of the pixel formed by the clock horizontal synchronous signal, there is located a pixel formed by the clock horizontal synchronous signal CLKH2 so that the diagonal quarter areas are allowed to be adjacent to each other. As such, at the upper left side of the portion adjacent to both pixels, it is possible to form a diagonal half pixel.

Though not shown, like the above description, by locating the pixel formed by the clock horizontal synchronous signal CLKH1 and the pixel formed by the clock horizontal synchronous signal CLKH2 at the predetermined places, at the lower right and the lower left places of the portion adjacent to both of the pixels, it is possible to form a diagonal half pixel, respectively.

The pattern matching operation is executed by the pattern matching circuit 7 in the same manner as in the first embodiment, so that the curve portion or the sloped line portion is detected.

If the curve portion or the sloped line portion of a character or a graphic to be printed is detected, the pixel disposition for smoothly representing the sloped line or curve portion is fitted to the detected pixels.

Concretely, in the case of the change of the dot disposition of the five pixels represented by FIG. 8(1), the foregoing clock horizontal synchronous signals CLKH1 and CLKH2 serve to control the application of the laser beam R into the pixel for forming C2 of a pixel inside of a cross-fitted graphic pattern (a of FIG. 6), that is, the pixels B3 and C2 inside of the graphic pattern (a' of FIG. 7) of the cross-fitted part immediately after it is moved by one pixel in the main scanning direction A. This results in being able to form as a pixel a diagonal half area located at the lower right side of the pixel B2 inside of a' of FIG. 7.

Further, in the case of the change of the dot disposition of the five pixels represented by FIG. 8(2), the clock horizontal synchronous signals CLKH2 and CLKH1 serve to control the application of the laser beam R to B2 of the pixel inside of the graphic pattern (b of FIG. 6) of the cross-fitted part, that is, A2 and B1. This results in being able to form as a pixel a diagonal half area located at upper left side of the pixel B2 (see (b) of FIG. 17).

In the case of the change of the dot disposition of the five pixels represented by FIG. 8(3), the clock horizontal synchronous signals CLKH2 and CLKH1 serve to control the application of the laser beam R to B2 of the pixel inside of the graphic pattern (c of FIG. 6) of the cross-fitted part, that is, A2 and B3. This results in being able to form as a pixel a diagonal half area located at lower left side of the pixel B2.

In the case of the change of the dot disposition of the five pixels represented by FIG. 8(4), the clock horizontal synchronous signals CLKH2 and CLKH1 serve to control the application of the laser beam R to C2 of a pixel inside of the graphic pattern (d of FIG. 6) of the cross-fitted part, that is, B1 and C2 of the pixels inside of the graphic pattern (d' of FIG. 7) of the cross-fitted part immediately after it is moved by one pixel in the main scanning direction A. This results in being able to form as a pixel a diagonal half area located at upper right side of the pixel B2 inside of b' of FIG. 7 (see (a) of FIG. 17).

FIG. 18 shows the same graphic pattern formed by printing the sloped portion or the curve of a character or a graphic to be printed by using the pixels having a diagonally half size. To exemplarily stand for the graphic pattern, one line is represented by training one pixel. With respect to this line, it is not possible to fit the diagonally half sized pixel, resulting in forming an inexact portion. It does not have any influence on the actual printing. The foregoing pattern matching is a mere example. By storing various memory patterns in the laser printer 1, it is possible to perform various kinds of pattern matching.

As described above, the laser printer 1 of this embodiment is capable of forming a pixel containing a substantially diagonal quarter area of one pixel adjacent to the pixel in the main scanning or sub scanning direction and thereby forming a diagonal half pixel of one pixel at the portion adjacent to both of the pixels in the substantially diagonal quarter areas of these two pixels. If the sloped line or the curve of a character or a graphic to be printed is detected, therefore, it is possible to form a substantially diagonal half area of one pixel corresponding to the detected form.

Therefore, if the line printed by the laser printer 1 of this embodiment is compared with the line printed by the conventional laser printer having a recording density of about 300 dpi, the difference is obvious.

The line printed by the conventional laser printer is formed of pixels each of which is substantially elliptic as shown in FIGS. 11(a) to (e). Hence, except the horizontal line shown in FIG. 11(a) and the vertical line shown in FIG. 11(e), for all the other lines such as a sloped line approximating to the horizontal line shown in FIG. 11(b), a line sloped at an angle of slope of 45° as shown in FIG. 11(c), and a sloped line approximating to the vertical line as shown in FIG. 11(d), a stepwise jaggy takes place between the vertical pixels, resulting in impairing the smoothness of the line.

On the other hand, any sloped line printed by the laser printer 1 of this invention is formed to have consecutive pixels buried to the substantially diagonal half area of one pixel on both side of the line width as shown in FIG. 11. The conventional laser printer offers a perpendicularly stepwise jaggy around the sloped line, while the laser printer 1 of this invention is capable of smoothly printing the sloped line or the curve. Further, since the empty area to be essentially formed by black pixels is reduced, the image quality of the inclined portion given by the laser printer 1 is remarkably improved as compared to that given by the conventional laser printer if viewed from a normal observation distance. Any horizontal or vertical line printed by the laser printer 1 is the same as that printed by the conventional laser printer.

Figure 19:
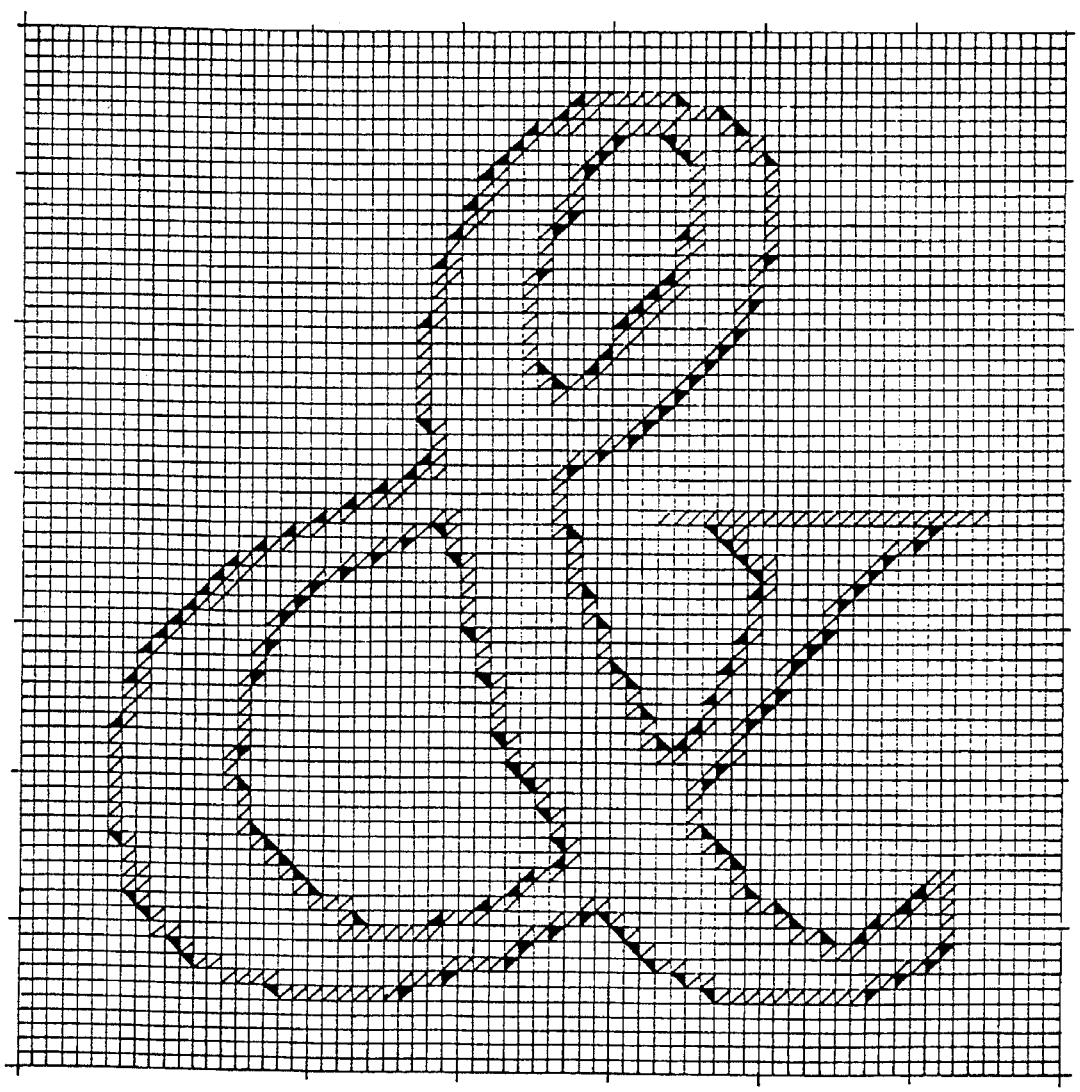
FIG. 19 is an expanded plane view showing a character printed by the laser printer of FIG. 1.
Figure 20:
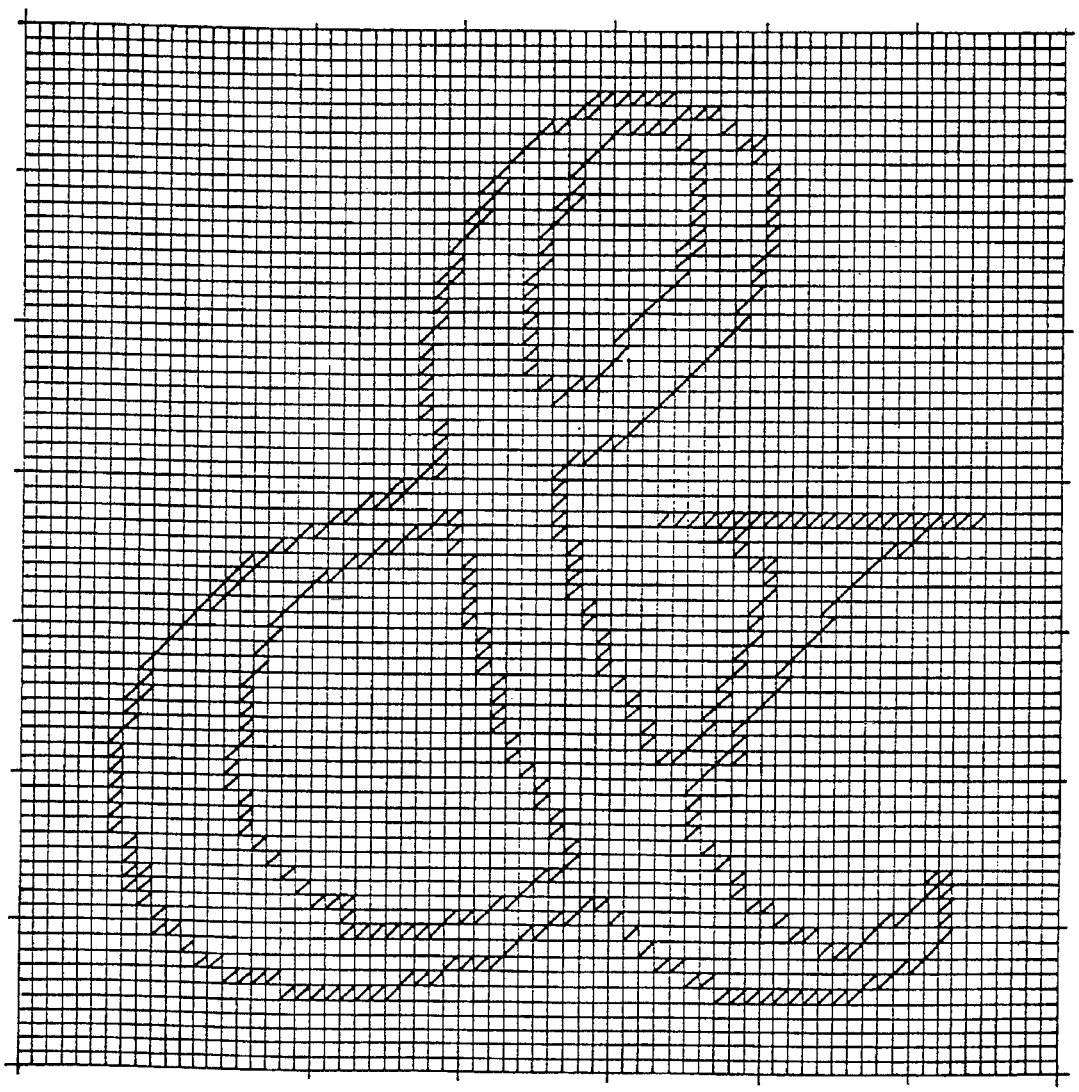
FIG. 20 is an expanded plane view showing a character printed by the conventional laser printer.
Figure 21A:
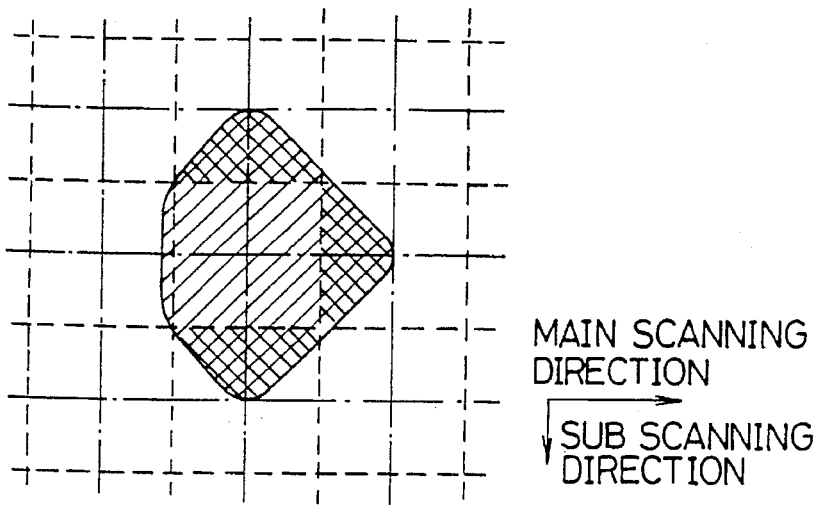
FIG. 21(a) is a view showing a pixel with extra quarter pixels appended to 3 edges.
Figure 21B:
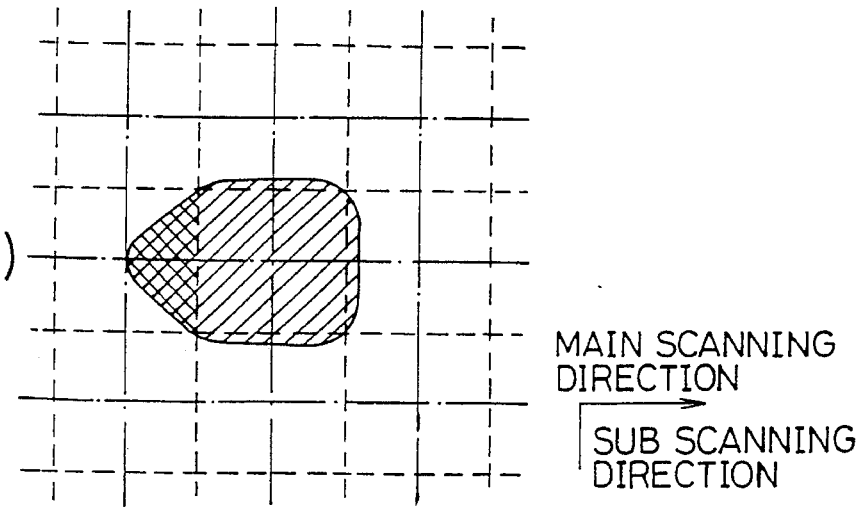
FIG. 21(b) is an explanatory view showing one example of a form of a pixel containing a substantially diagonal quarter area of an adjacent pixel.

The exemplary picture illustrated in FIG. 18 is formed so that consecutive pixels are formed to be buried into the substantially diagonal half area of each pixel. Without having to form consecutive pixels, as shown in FIG. 19, it is well understood that the image quality of the sloped line or the curve is greatly improved. The printed character shown in FIG. 20 does not employ a pixel to be buried into a substantially diagonal half area of one pixel for a reference purpose.

The foregoing embodiment does not define the present invention but may be changed into various modifications within the scope of the invention. According to this embodiment, the clock horizontal synchronous signal CLKH1 or CLKH2 formed by dividing the pulse width. T0 for forming one pixel into ten is used so that the form of one pixel is made to contain a substantially diagonal quarter area of an adjacent pixel. In particular, the divisional number of the pulse width T0 is not limited. The concrete numerical values of each time t1 to t10 or S1 to S9 may employ any kind of values depending on the light-radiating condition and the recording density. If the light energy distribution is formed into a predetermined form under each light-radiating condition, by properly adopting a value of each time t1 to t10 or S1 to S9, it is possible to produce a pixel containing one or more substantially diagonal quarter pixels of the adjacent pixel as shown in (a) and (b) of FIG. 21.

The present invention may apply to an optical printer using a photosensitive body but also a heat mode recording system with a laser included a laser thermal transfer printer or an LED printer lamp having an LED as a light source. ***

Embodiment 3

The other embodiment of this invention will be described below, referring to FIGS. 22 to 33. An image forming apparatus according to this embodiment is a LED (Light Emitting Diode) printer having a low recording density of about 300 dpi. Further, the exposure control means included in the LED printer of this embodiment has the same arrangement as the printer controller 2 of the first embodiment, Hence, the description of this arrangement is not repeated herein and the same components of the exposure control means of this embodiment as the first embodiment have the same reference numbers (see FIG. 2).

Figure 22:
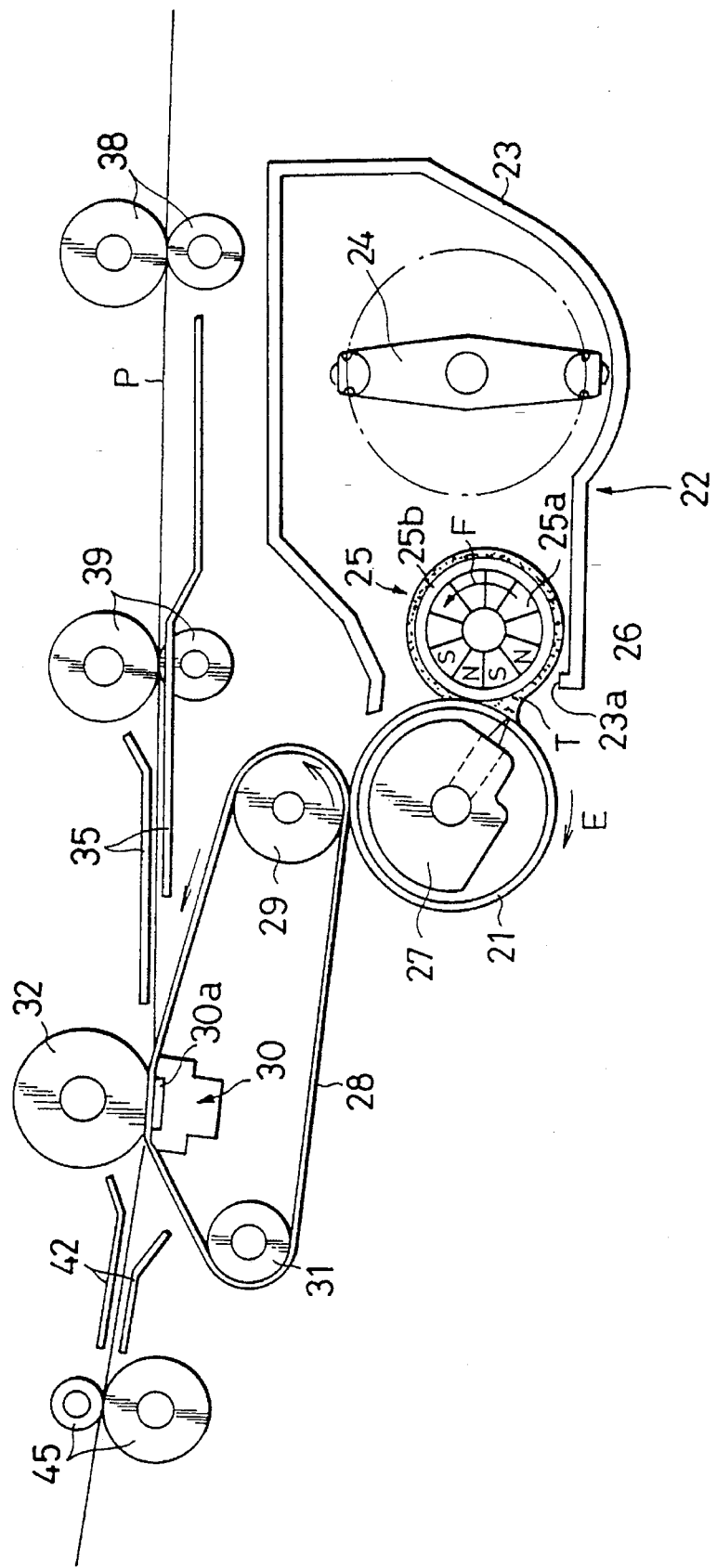
FIG. 22 is a longitudinal section showing a photosensitive drum, a developing unit and a dielectric belt composing an LED printer according to another embodiment of the invention.

The LED printer according to this embodiment, as shown in FIG. 22, provides a photosensitive drum 21 having a cylindrical photosensitive body to be rotated in the E direction within the device itself. A developing unit 22 is located in the right hand of the photosensitive drum 21. An exposing device (exposure means) 27 is located inside of the photosensitive drum 21. Further, a dielectric belt 28 is located above the photosensitive drum 21.

Figure 24:
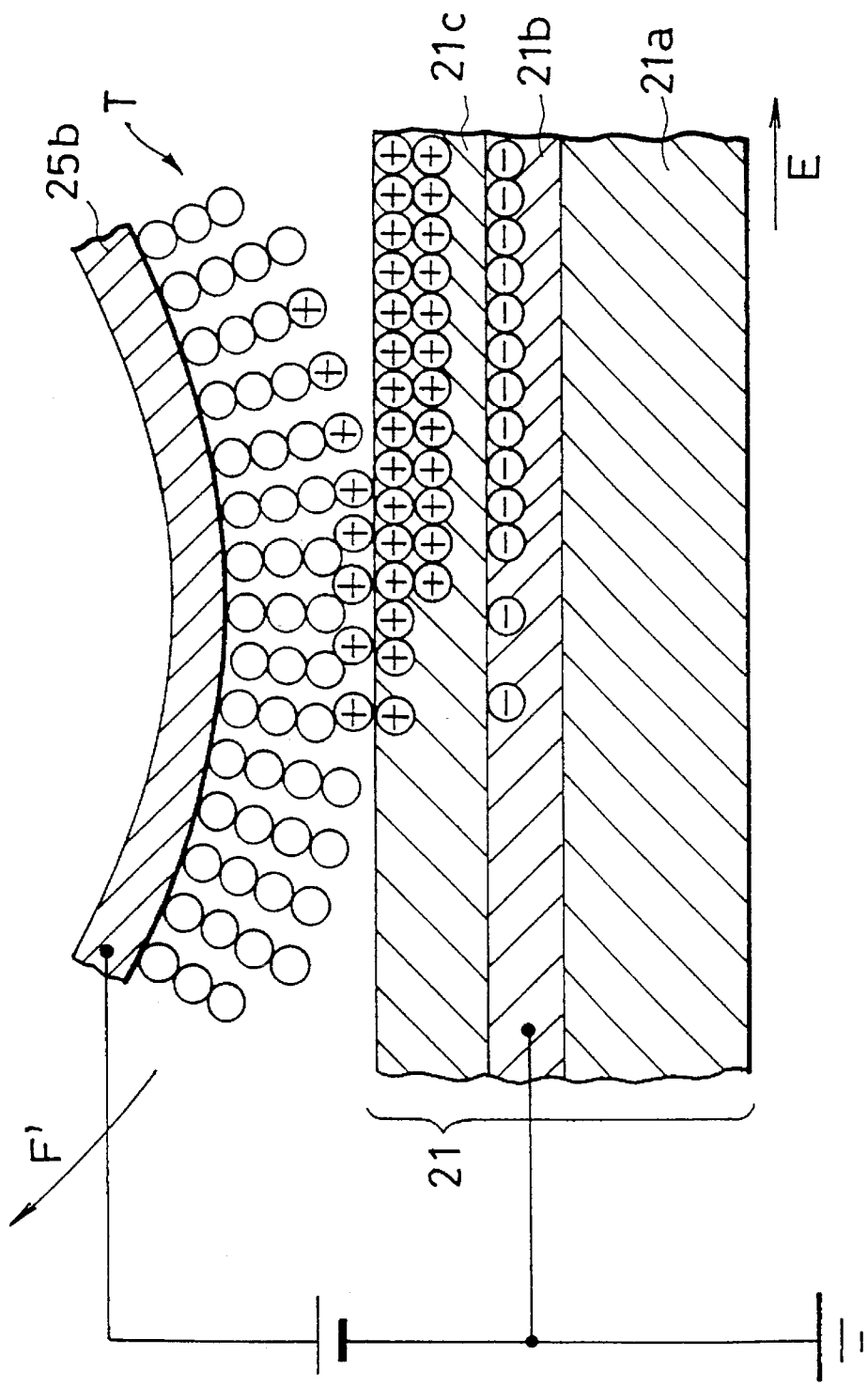
FIG. 24 is an explanatory view showing the state where the surface of the photosensitive drum is charged by conductive toner coming into contact with the drum.

The photosensitive drum 21, as shown in FIG. 24, provides, on the surface of an optically transparent cylindrical supporting body 21a, a transparent conductive layer 21b formed of an $In_2O_3$ or $SnO_2$ sputtering film and a photoconductive layer 21c made of a photoconductive material such as Se, ZnO, CdS or noncrystalline Si. In this embodiment, the $In_2O_3$ layer having a thickness of 0.5 μm is formed as the transparent conductive layer 21b. Further, the noncrystalline Si layer having a thickness of 3 μm is formed as the photoconductive layer 21c.

The developing unit 22 is arranged to have a developing bath 23 for storing conductive toner T as a developing agent, a stirring roller 24 for stirring the conductive toner T, the roller 24 being rotatably provided inside of the developing bath 23, a toner holding body 25 located against the photosensitive drum 21 and at an opening 23a of the developing bath 23, and a doctor blade 26 fixed downwardly of the toner holding body 25 and at the opening 23a of the developing bath 23.

The toner holding body 25 extends along the width of the photosensitive drum 21 and is composed of a magnetic roller 25a and a developing sleeve 25b. The magnetic roller 25a is arranged to have N-polarity and S-polarity magnets alternately disposed around the peripheral surface. The developing sleeve 25b is made of aluminum and martensite system stainless steel and is provided to cover the outer peripheral surface of the magnetic roller 25a. The toner holding body 25 serves to hold the conductive toner T on the surface of the developing sleeve 25b and convey the conductive toner T in the F' direction reverse to the F rotating direction of the magnetic roller 25a by virtue of the alternate magnetic fields generated with the F-directional rotation inside of the magnetic roller 25a. In addition, the doctor blade 26 serves to adjust the amount of the conductive toner T held on the surface of the developing sleeve 25b and conveyed in the F' direction into a predetermined amount.

The conductive toner T is formed by mixing resin made of styrene acrylic copolymer with magnetic powder like iron powder or ferrite or carbon black and grinding the mixed material into smaller grains, each of which is several μm or tens of μm in diameter.

The exposing device 27 is composed of an LED array having two or more luminous elements (luminous diodes) arranged along the width of the photosensitive drum 21. By controlling the exposure of the printer controller 2 as described below, the beam is allowed to be applied into the developing unit 22. The beam passes through the transparent supporting body 21a and the transparent conductive layer 21b of the photosensitive drum 21 and is focused onto the photoconductive layer 21c. The light scanning done by the exposing device 27 is actuated only when the photosensitive drum 21 is rotated in the E direction, because a plurality of luminous elements are arranged along the width of the photosensitive drum 21.

The dielectric belt 28 is superior in mechanical strength and is formed like an endless belt. It is made of a film material having highly heat-resistant polyimide resin as a main component. This dielectric belt 28 is wound in a manner to wrap a transfer roller 29 located above the photosensitive drum 21, a heating device 30 (to be described later) located leftward of and slightly above the transfer roller 29, and a tension roller 31 located in the lower left of the heating device 30. The dielectric belt 28 is fitted between the photosensitive drum 21 and the transfer roller 29.

The dielectric belt 28 is made of a filmy polyimide resin as its material. However, the material of the belt 28 is not limited to a polyimide resin. It just needs to make the transferring surface of the conductive toner T isolated as described later. For example, the belt 28 may be made by coating fluorine on the metal belt such as an electrically cast nickel belt as a base. The thickness of the dielectric belt 28 is not limited to a particular value. However, considering the heat conductivity and mechanical strength, it is preferable to give the belt 28 a thickness of about 10 μm to 200 μm. To properly adjust the luster of a resulting image, it may be possible to make the surface coarse.

The heating device 30 is used for heating and melting the conductive toner T to be transferred onto the surface of the paper from dielectric belt 28. Device 30 is made by printing a heating planar Mo system resistor 30a on an alumina ceramic substrate, laminating and printing a glass coat on the resistor. The heading device 30 is arranged to pass electricity through the heating resistor 30a for rapidly raising the temperature to a predetermined value. The heating surface of the heater is located in contact with the surface of the dielectric belt 28.

A pressing roller 32 is located above the heating device 30. The pressing roller 32 serves to apply a force of pressure onto the heating device 30 through the dielectric belt 28 while it is rotated. This roller 32 is located to press the recording paper conveyed from the feeding means 34 (to be described later) onto the pressuring portion of the dielectric belt 28.

Figure 23:
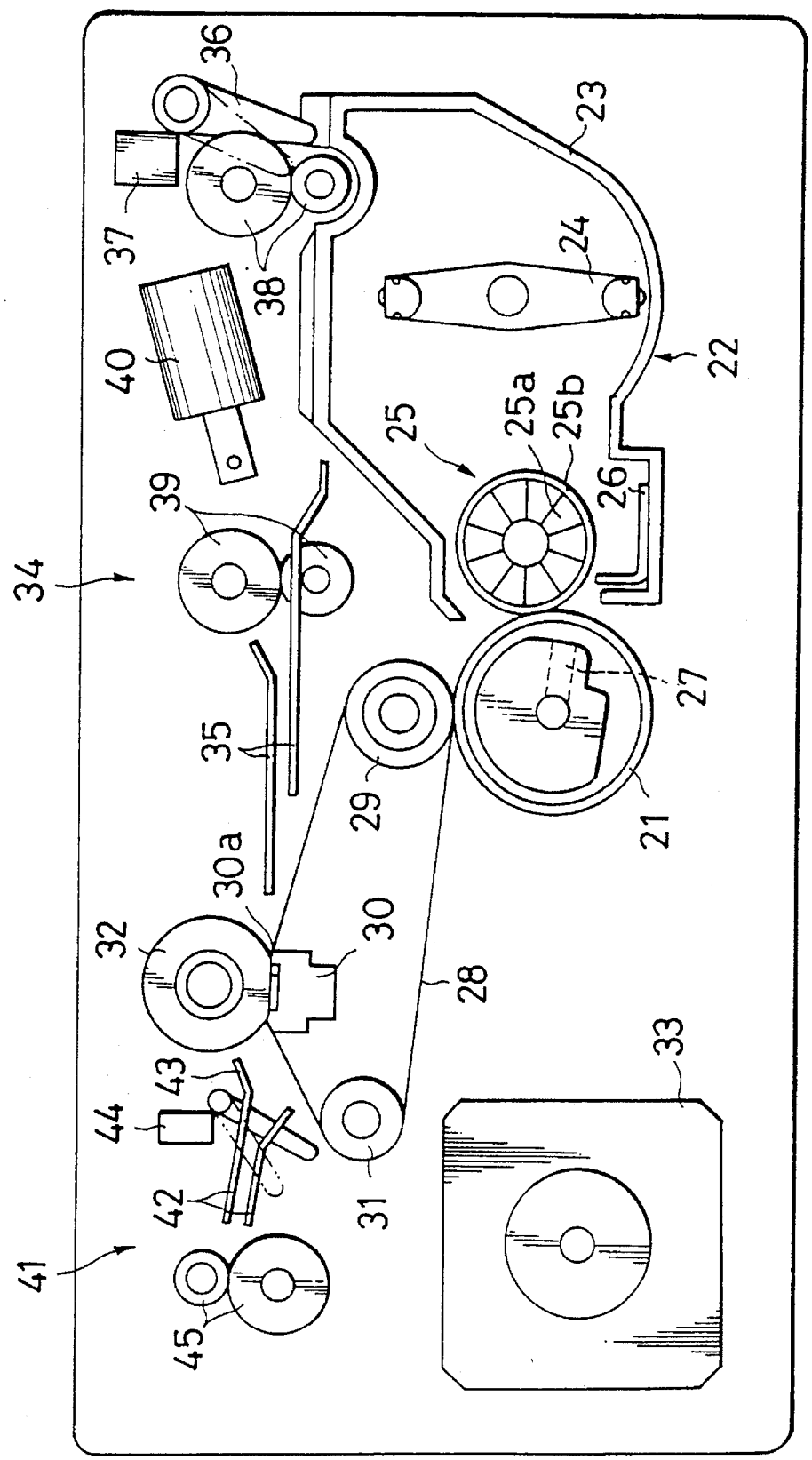
FIG. 23 is a schematic diagram showing various components included in the LED printer shown in FIG. 22.

The image forming apparatus according to this embodiment, as shown in FIG. 23, provides a stepping motor 33, serving as a driving source of the device, a paper feeding means 34 for feeding the recording paper P to the pressuring portion between the dielectric belt 28 and the pressing roller 32, and a paper ejecting means 41 for ejecting the recording paper P out of the device.

The paper feeding means 34 is located above the photosensitive drum 21, the developing unit 22, and the dielectric belt 28 and is arranged to have as its components conveying guide plates 35, 35 forming a paper feeding path between a paper feeding opening (not shown) and the pressing portion between the dielectric belt 28 and the pressing roller 32, a paper sensing actuator 36 located near the paper feeding opening, a paper sensing switch 37, paper feeding rollers 38, 38, resist rollers 39, 39 located on the way to the conveying guide plates 35, 35, and a resist solenoid 40 for controlling rotation of this resist roller 39.

The paper ejecting means 41 is located leftward of the pressing portion between the dielectric belt 28 and the pressing roller 32 and is arranged to have as its components paper ejecting guide plates 42, 42 forming a paper ejecting path connecting between the pressing portion, between the dielectric belt 28 and the pressing roller 32, and the paper ejecting outlet (not shown), a paper sensing actuator 43 and a paper sensing switch 44 both located near the pressing portion between the dielectric belt 28 and the pressing roller 32, and paper ejecting rollers 45, 45 located at the end of the paper feeding guide plate 42.

Next, the description will be oriented to the operation of the image forming apparatus arranged as described above.

At first, one recording paper P is fed into the paper feeding opening by a paper feeding means (not shown). The tip of the recording paper P serves to pull up the paper sensing actuator 36 so that the paper sensing switch 37 may sense the supply of the recording paper P and send a paper sending signal to the stepping motor 33. In response to the signal, the stepping motor is driven to rotate.

Next, the rotation of the stepping motor 33 is transmitted to the paper feeding roller 38 through the effect of a rotation transmitting mechanism (not shown), thereby allowing the paper feeding roller 38 to rotate. With the rotation of the paper feeding roller, the recording paper P is conveyed to the resist roller 39.

When the recording paper P is conveyed up to the resist roller 39, the paper feeding is temporarily stopped, because the rotation of the resist roller 39 is braked under the control of the resist solenoid 40. At this time, the tail end of the recording paper P is pressed between the paper feeding rollers 38, 38. Since the surface of each roller has small friction, those rollers are being slipped on both surfaces of the recording paper P when the feeding of the recording paper P is stopped.

Figure 25:
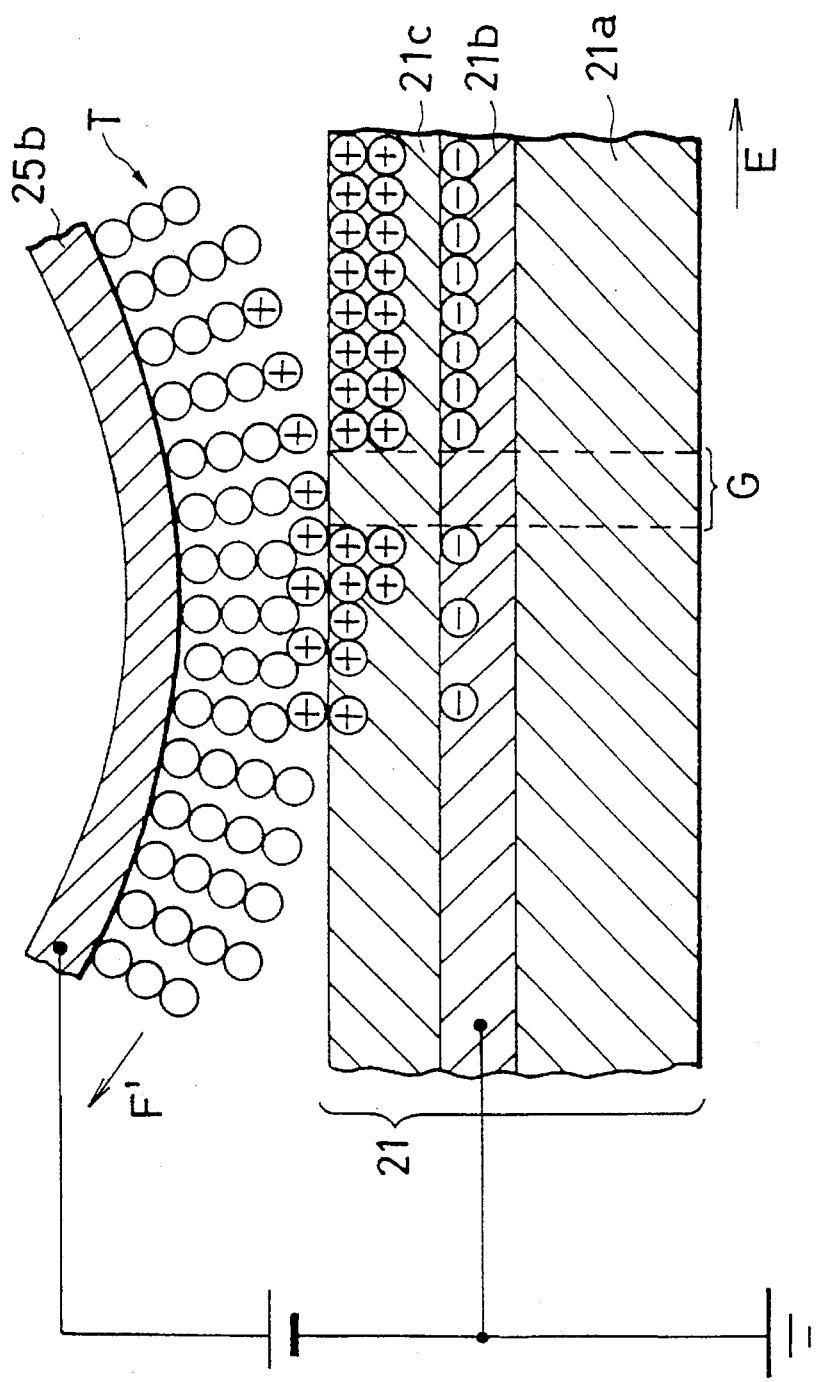
FIG. 25 is an explanatory view showing the state where the surface of the photosensitive drum is neutralized by the exposure of the exposing device.
Figure 26:
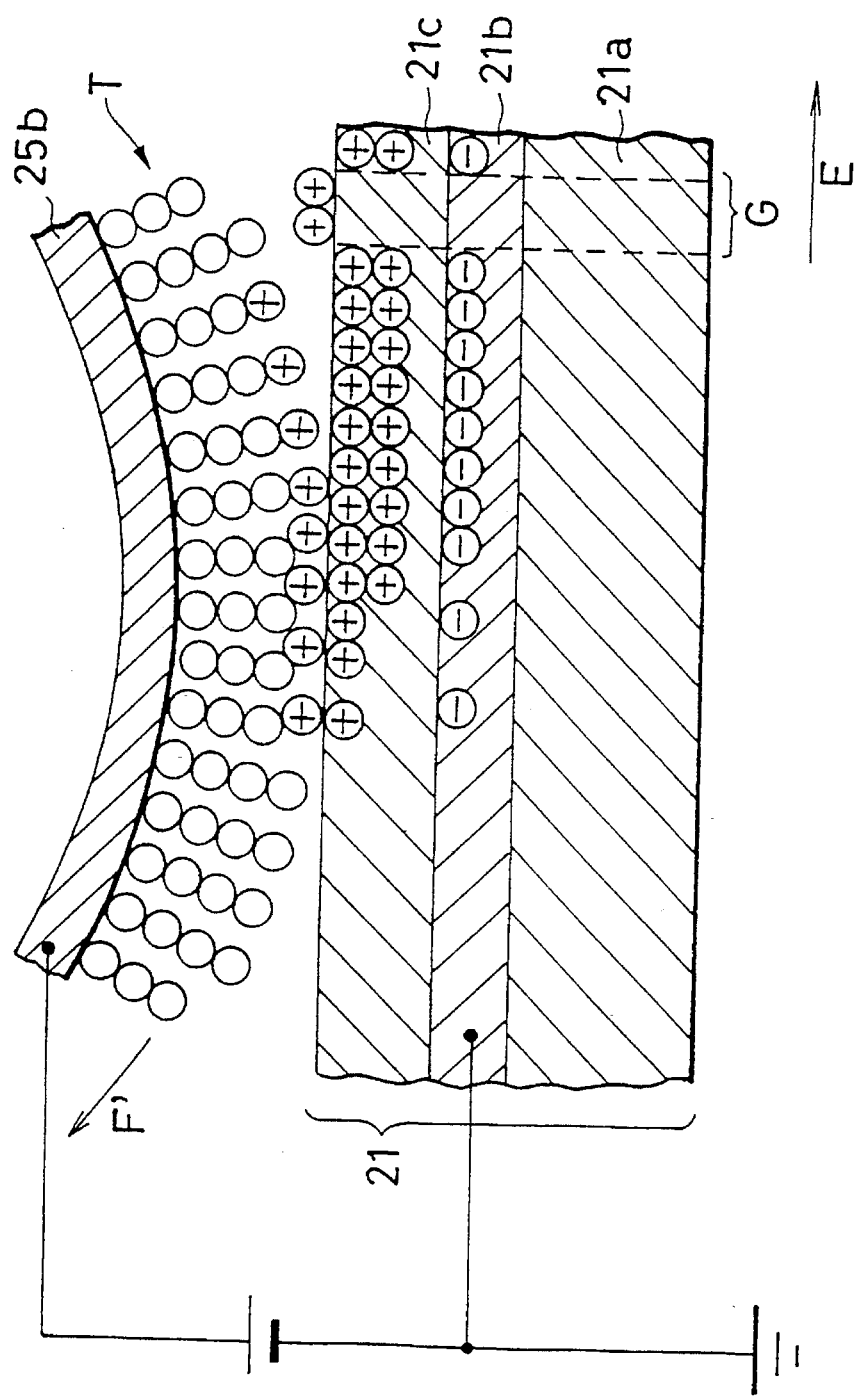
FIG. 26 is an explanatory view showing the state where a toner image is developed on the surface of the photosensitive drum.

Next, the description will be oriented to the developing process of the conductive toner T, referring to FIGS. 24 to 26.

At first, the conductive toner T stored in the developing bath 23 is attracted onto the surface of the developing sleeve 25b as shown in FIG. 24 through the effect of the alternate magnetic fields generated by the rotation of the magnetic roller 25a in the F direction. At this time, the conductive toner T is conveyed on the surface of the developing sleeve 25b in the direction F' reverse to the E-directional rotation of the photosensitive drum 21. During that time, on the contact portion between the conductive toner T attracted on the surface of the developing sleeve 25b and the photosensitive drum 21, charges are injected from the developing sleeve 25b to the photosensitive drum 21 through the conductive toner T through the effect of the potential difference of several tens of volts, applied between the developing sleeve 25b and the transparent conductive layer 21b. This results in applying the substantially same potential as the developing sleeve 25b onto the surface of the photosensitive drum 21.

Though the conductive toner T contacts the photosensitive drum 21, since the surface of the photosensitive drum 21 has the same potential as the developing sleeve 25b, the force of magnetism generated by the magnetic roller 25a has a sufficient command of the conductive toner T so that the conductive toner is not attracted onto the photosensitive drum 21.

Next, as shown in FIG. 25, immediately before the conductive toner T is separated from the photosensitive drum 21 or at the portion G near the separation point, the luminous elements for the image pattern are sequentially selected from the exposing device 27 so as to perform the exposure. At this time, the charges injected on the surface of the photosensitive drum 31 are neutralized so as to cause an electric potential difference between the surface of the photosensitive drum 21 and the developing sleeve 25b.

A toner image developed on the surface of the photosensitive drum 21 is transferred on the surface of the dielectric belt 28 at the pressed portion between the photosensitive drum 21 and the transfer roller 29 through the dielectric belt 28 by applying a voltage having an opposite polarity to the injected charges of the toner image into the transfer roller 29. On the other hand, the CPU (Central Processing Unit) (not shown) of the engine controller operates to send a signal to the resist solenoid 40 so as to match the toner image on the surface of the dielectric belt 28 to the recording paper P on the pressed portion between the dielectric belt 28 located on the heating device 30 and the pressing roller 32. In response to the signal, the resist roller 39 is released out of an inoperative state so that the recording paper P is conveyed to the pressed portion between the dielectric belt 28 and the pressing roller 32.

And, the dielectric belt 28 having the toner image transferred thereon and the recording paper P being overlapped with each other are conveyed between the heating device 30 and the pressing roller 32. While they are being conveyed, the transfer and fixing of the toner image onto the recording paper P are carried out. That is, when the recording paper P is fed out with the paper being pressed between the dielectric belt 28 and the pressing roller 32, the surface of the dielectric belt 28 has more excellent separating characteristic to the conductive toner T heated and melted by the heating device 30 than the recording paper P. As a result, almost of the conductive toner T attracted on the surface of the dielectric belt 28 is transferred and fixed on the recording paper P.

After that, the recording paper P, having the toner image transferred and fixed thereon, serves to pull up the paper sensing actuator 43 so that the paper is ejected onto the paper tray (not shown) through the paper ejecting opening through the effect of the rotation of the paper ejecting roller 45. A predetermined time later than when the feeding paper sensing signal sent from the paper sensing switch 37 and the ejecting paper sensing signal sent from the ejecting paper sensing switch 44 are not received, the passage of current through the heating resistor 30a of the heating device 30, and the drive of the stepping motor 43, are stopped. Then, the series of operations is terminated.

Next, the description will be oriented to the operation of the printer controller 2 for controlling the exposure of the exposing device 27.

Figure 27A:
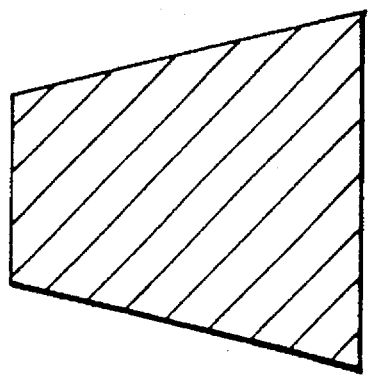
FIGS. 27 (a), (b) and (c) are explanatory views showing each form of light energy distributions formed by the clock horizontal synchronous signals CLKH1, CLKH2, and CLKH3.
Figure 27B:
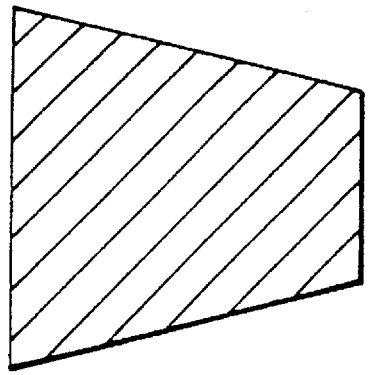
Figure 27C:
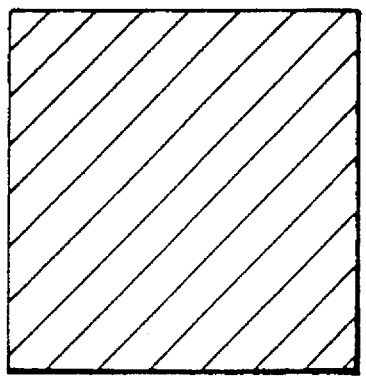
Figure 28:
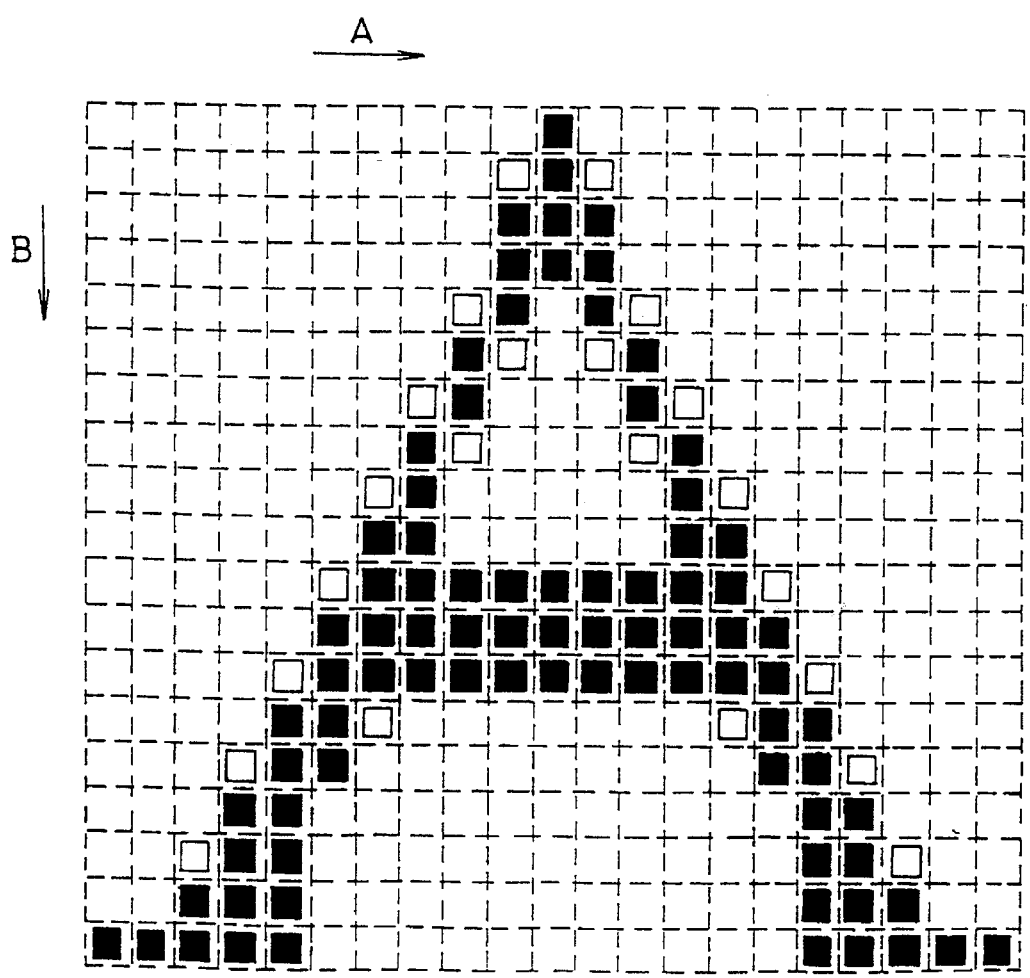
FIG. 28 is an explanatory view showing the state where a curve portion or a sloped line portion of a character or a graphic is identified or sensed from a graphic pattern.

Like the first embodiment, the printer controller 2 is arranged to perform the pattern matching treatment of a picture signal of a character and a graphic sent from the host computer (not shown) for identifying and sensing a curve and a sloped line of the character and the graphic and output each of the clock horizontal synchronous signals CLKH1, CLKH2 and CLKH3 from the pulse width modulating circuit 8 based on the information about the curve and the sloped line. When the clock horizontal synchronous signal CLKH1 is output in response to identifying and sensing the curve and the sloped line of the character and the graphic, the luminous elements of the LED array composing the exposing device 27 serve to apply a ray of light having a trapezoidal light energy distribution spreading out downwardly as shown in FIG. 27(a) onto the photosensitive drum 21. On the other hand, when the clock horizontal synchronous signal CLKH2 is output in response to identifying and sensing of the curve and the sloped line of the character and the graphic, the luminous elements of the LED array composing the exposing device 27 are driven to apply a ray of light having a trapezoidal light energy distribution spreading out downwardly as shown in FIG. 27(b) onto the photosensitive drum 21. The light energy distribution of the ray applied when the clock horizontal synchronous signal CLKH3 is output is substantially square. The light energy distribution formed like a trapezoid by controlling the application of light is formed at a constant scanning speed, a constant LED output and a constant beam diameter.

Figure 29:
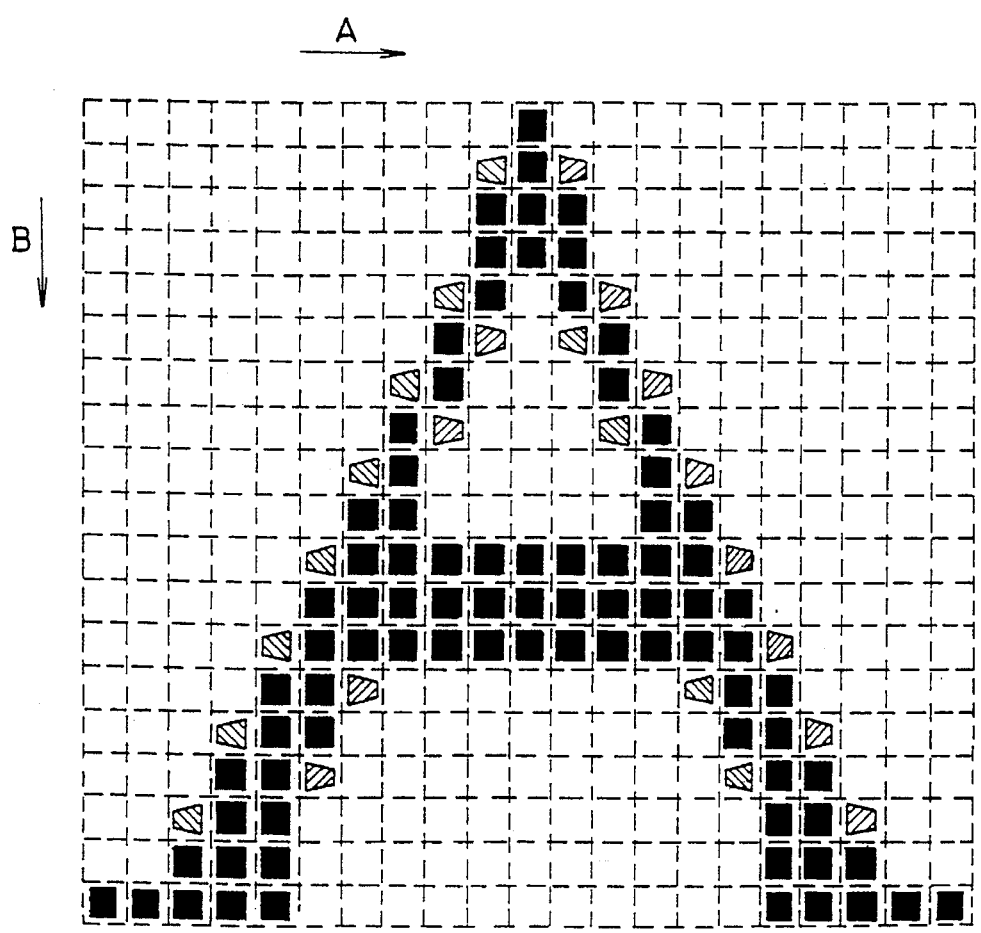
FIG. 29 is an explanatory view showing the state where trapezoidal dots are printed on the graphic pattern.
Figure 30A:
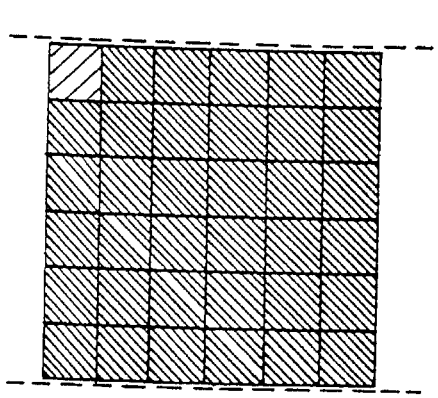
FIG. 30(a) shows a horizontal line.
Figure 30B:
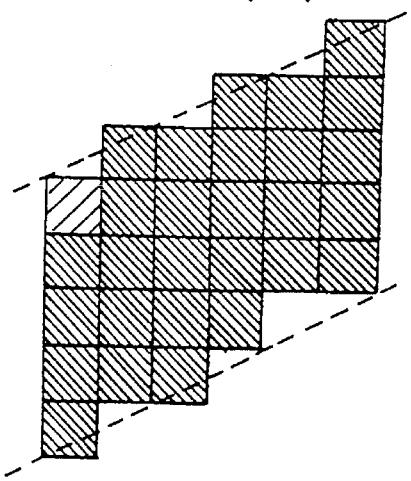
FIG. 30(b) shows a sloped line approximating to a horizontal line.
Figure 30C:
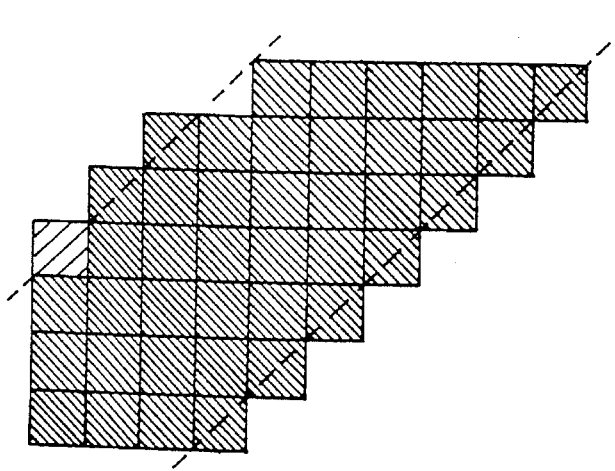
FIG. 30(c) shows a line sloped at 45×.
Figure 30D:
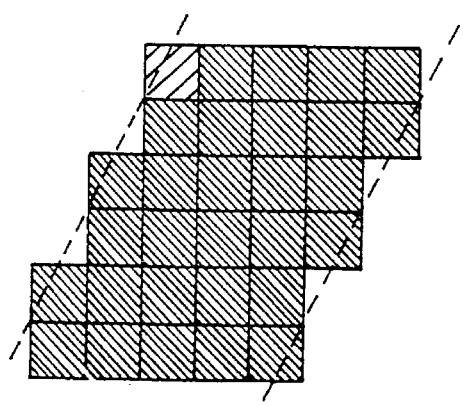
FIG. 30(d) shows a sloped line approximating to the vertical line.
Figure 30E:
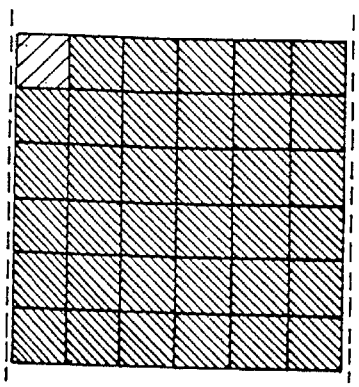
FIG. 30(e) shows a vertical line.

Therefore, the LED printer according to this embodiment operates to identify and sense the pixels matching to the curve and the sloped line of a character or a graphic by the pattern matching operation and then to print the trapezoidal dots spreading out downwardly or upwardly as shown in FIG. 29 on the pixels when performing the control of exposure as mentioned above.

Next, the LED printer according to this embodiment is compared with the conventional LED printer having a recording density of about 300 dpi in light of a printed line. The horizontal or vertical line printed by the LED printer of this embodiment is equal to that printed by the conventional LED printer.

The line printed by the conventional LED printer is formed of pixels, each of which is substantially square as shown in FIG. 30(*a*) to (*e*). Except the horizontal line shown in FIG. 30(*a*) and the vertical line shown in FIG. 30(*e*), therefore, a stepwise jaggy takes place between the pixels located vertically for any sloped line such as a sloped line approximating to the horizontal line shown in FIG. 30(*b*), a sloped line at an angle of slope of 45° as shown in FIG. 30(*c*), and a sloped line approximating to the vertical line as shown in FIG. 30(*d*). The stepwise jaggy results in impairing the smoothness of the line.

Figure 31A:
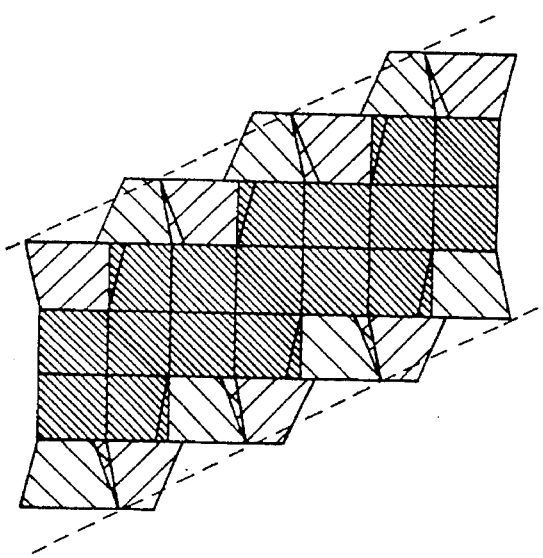
Figure 31B:
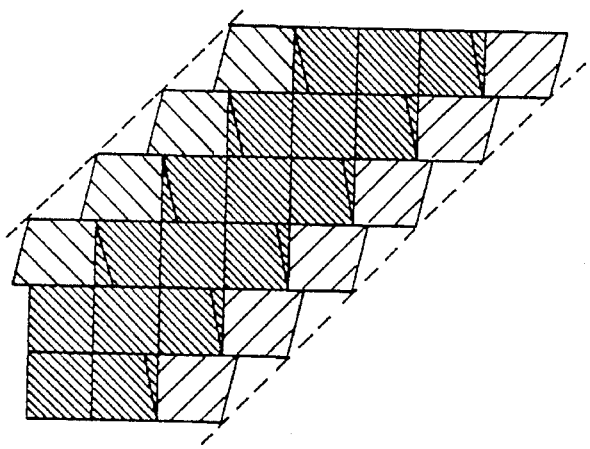
FIG. 31(b) shows a line sloped at 45×.
Figure 31C:
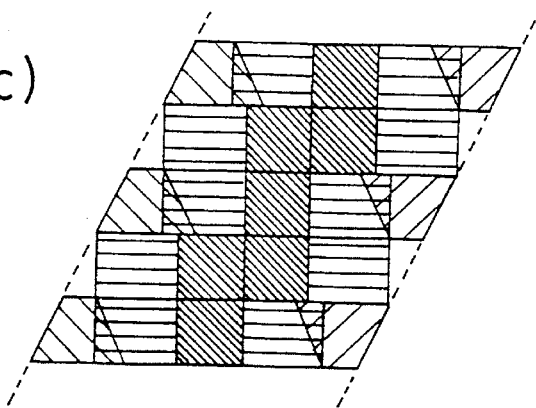
FIG. 31(c) shows a sloped line approximating to a vertical line.

On the other hand, the sloped line printed by the LED printer of this embodiment, the trapezoidal pixels are formed on both width ends of any sloped line such as a sloped line approximating to a horizontal line as shown in FIG. 31(*a*), a sloped line at an angle of slope of 45° as shown in FIG. 31(*b*) and a sloped line approximating to the vertical line as shown in FIG. 31(*c*). The edge sloped like a trapezoid represents the sloped portion of the sloped line to be printed. Hence, the LED printer of this embodiment may offer a far improved quality of a sloped portion than the conventional LED printer if it is viewed as keeping a normal observational distance from the image-printed paper.

Figure 32A:
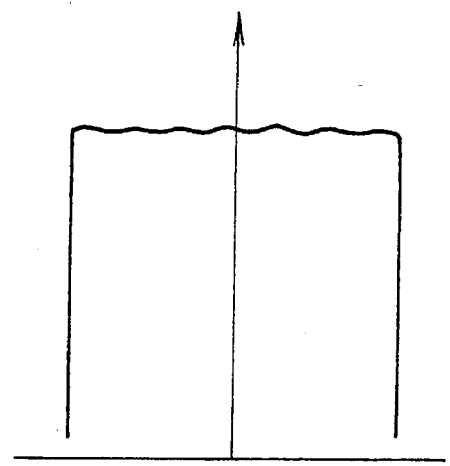
FIG. 32(a) is an explanatory view showing a substantially square lighting distribution formed by the conventional LED printer.
Figure 32B:
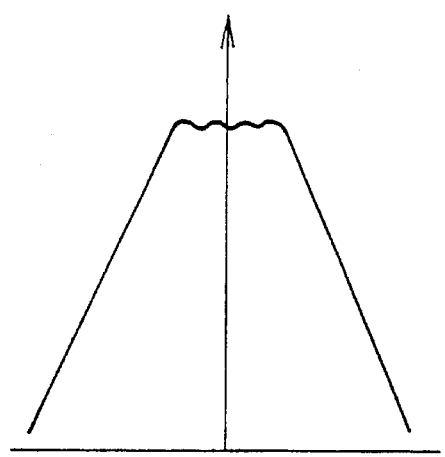
FIG. 32(b) is an explanatory view showing a substantially trapezoidal lighting distribution formed by the LED printer of this embodiment.
Figure 32C:
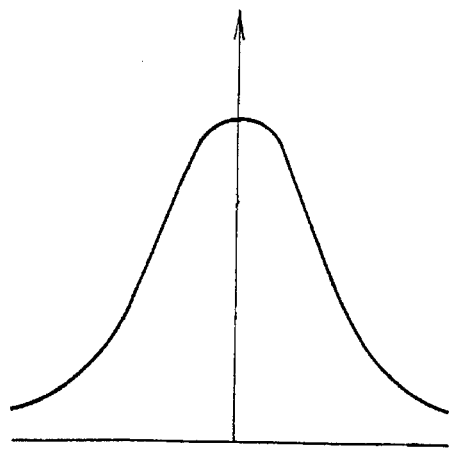
FIG. 32(c) is an explanatory view showing a Gaussian lighting distribution formed by the LED printer of this embodiment.
Figure 33:
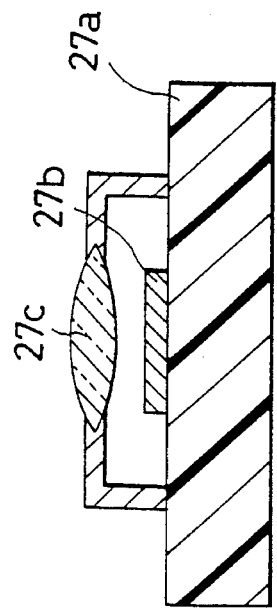
FIG. 33 is a longitudinal section showing the state where an optical lens system is provided to the luminous elements composing the LED array.

The ray of light applied from the luminous elements having the light energy distribution changed from a substantially square form to the trapezoidal form through the effect of the exposure control has a light distribution form changed from a substantially square as shown in FIG. 32(*a*) to a substantially trapezoid spreading out downwardly as shown in FIG. 32(*b*). Without having to use the exposure control done by the printer controller 2, as shown in FIG. 33, the luminous elements 27*b* composing the LED array 27*a* provide the optical lens system 27*c* for converting the light distribution from a trapezoidal form shown in FIG. 32(*b*) to a Gaussian form as shown in FIG. 32(*c*) so that the light energy distribution of a ray of light applied from the luminous elements 27*b* may be made trapezoidal or substantially trapezoidal.

Embodiment 4

Figure 37A:
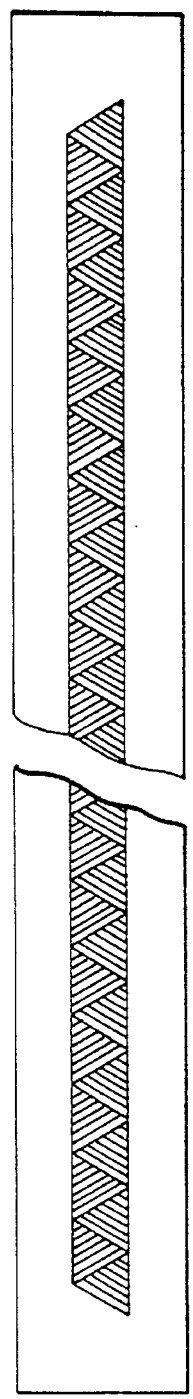
FIG. 37(a) is a plane view showing an LED array having the outer form of the overall luminous elements formed like a substantial trapezoid spreading out downwardly on the substrate and FIGS. 37(b) and (c) are plane views showing an LED array having the outer form of the overall luminous elements formed like a substantial parallelogram on the substrate.
Figure 37B:
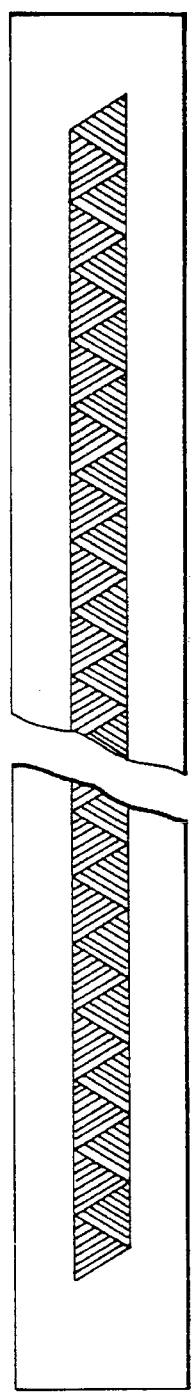
Figure 37C:
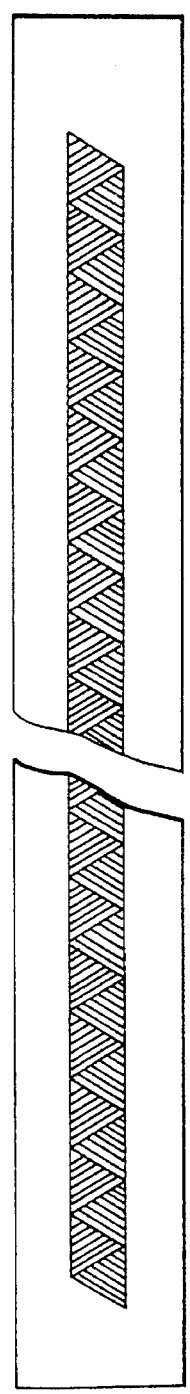
Figure 38:
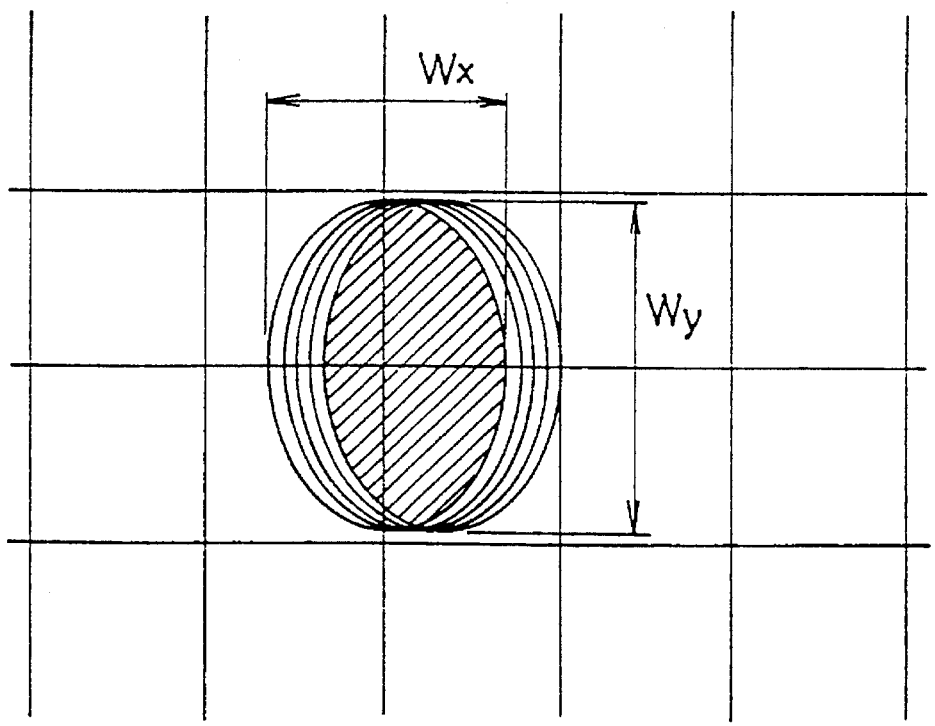
FIG. 38 is an explanatory view showing a light energy distribution for forming one pixel in the conventional image forming apparatus.
Figure 39:
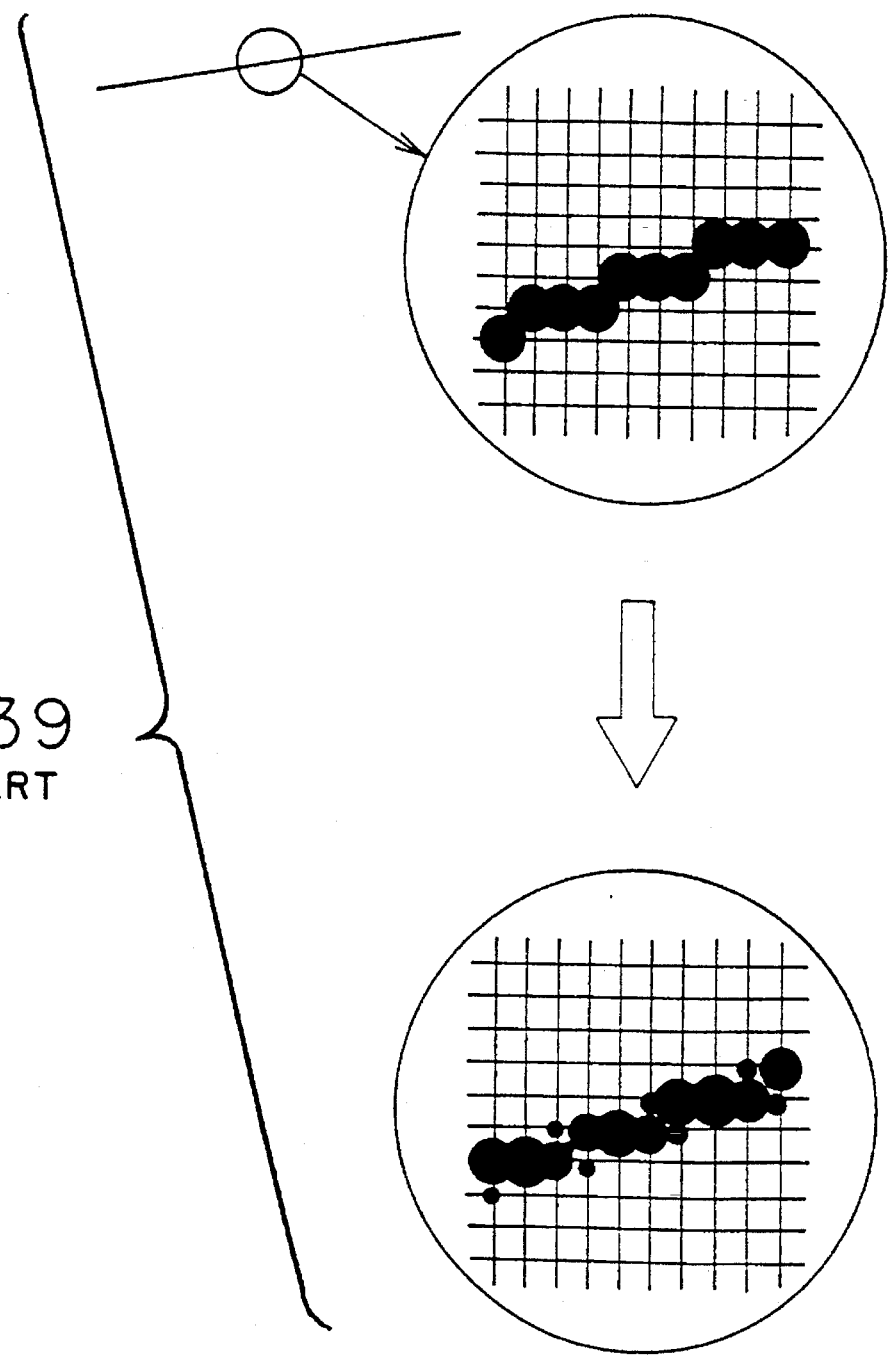
FIG. 39 is an explanatory view showing an example of a sloped line of a printed character where jaggedness is reduced by reducing the diameter of each pixel.
Figure 40:
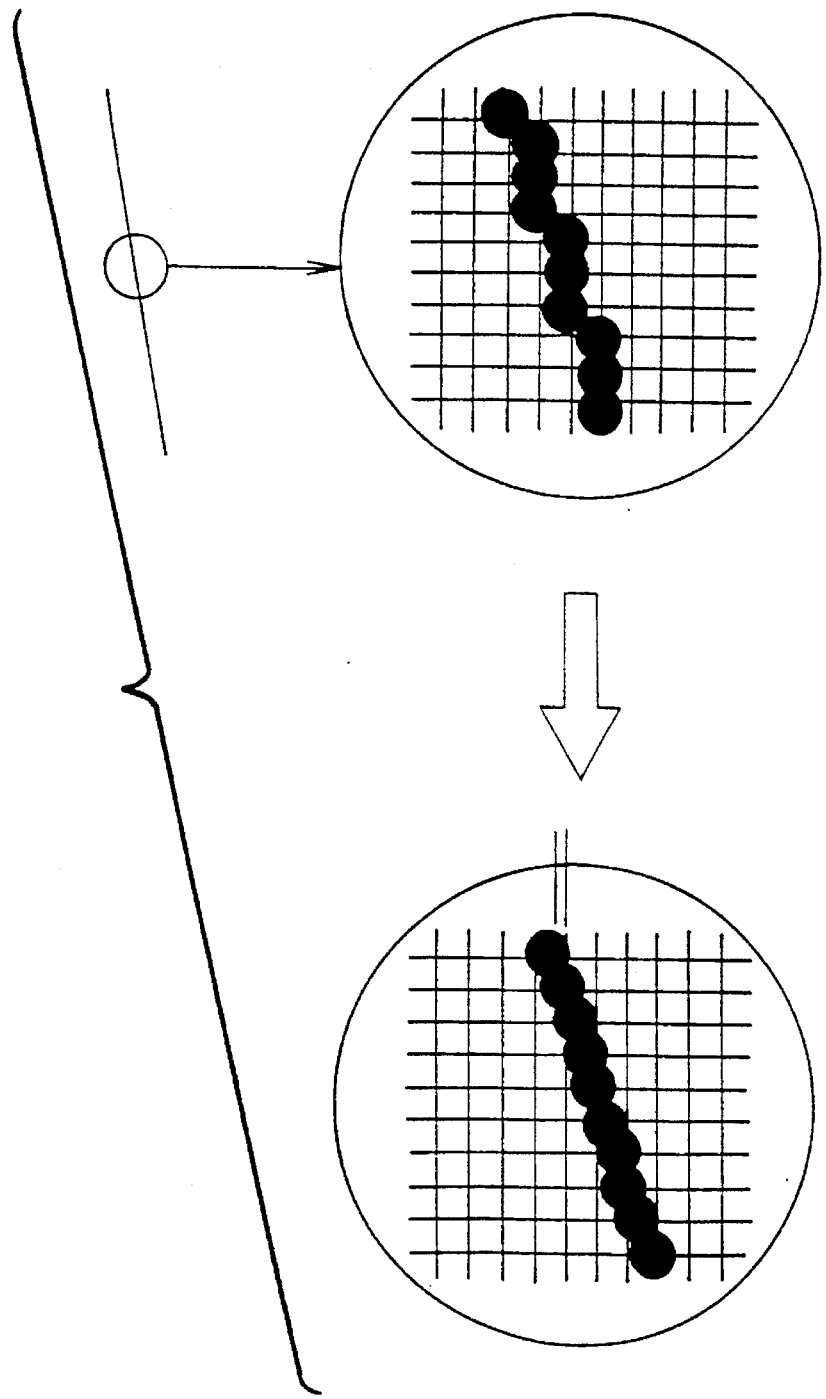
FIG. 40 is an explanatory view showing an example of a sloped line of a printed character where jaggedness is reduced by moving a pixel.

The other embodiment of this invention will be described below, referring to FIGS. 34 and 37(*a*), (*b*) and (*c*). The fourth embodiment has the same arrangement as the third embodiment except the printer controller 2 and the exposing device 27 included in the third embodiment. Hence, the description of the forth embodiment except the printer controller 2 and the exposing device 27 will be left out and the same components of the fourth embodiment as those of the third embodiment have the same numbers.

Figure 34:
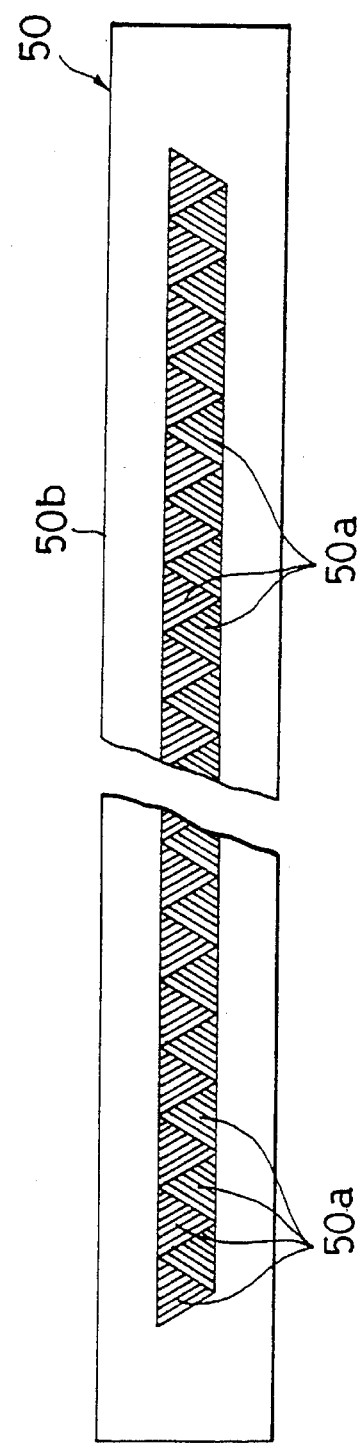
FIG. 34 is a plane view showing an LED array included in the LED printer according to another embodiment of the invention.
Figure 35A:
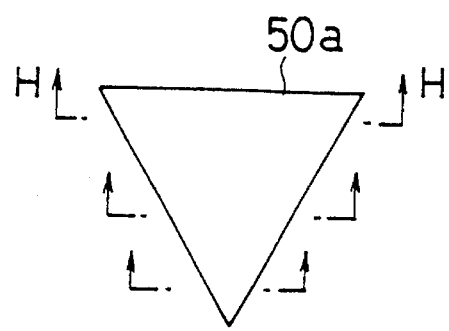
FIG. 35(a) is a plane view showing a luminous element of the LED array and FIGS. 35(b), (c) and (d) are explanatory views showing lighting distributions on respective sections of the luminous element.
Figure 35B:
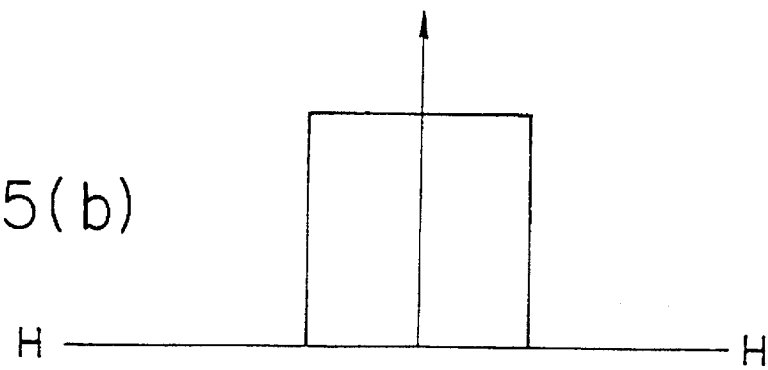
Figure 35C:
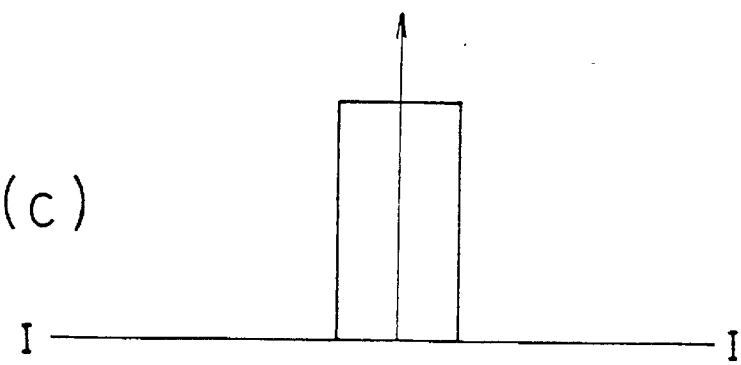
Figure 35D:
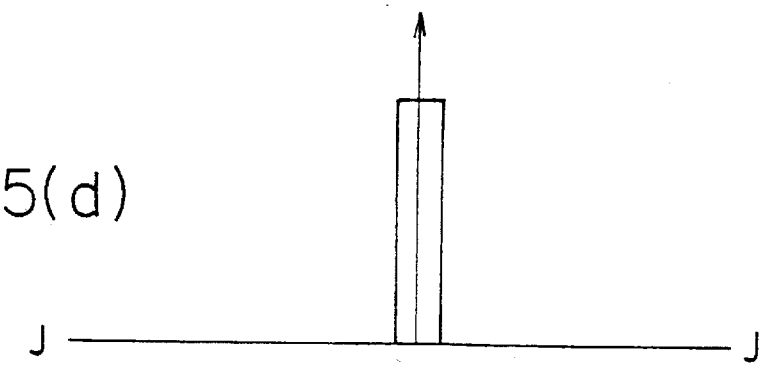
Figure 36A:
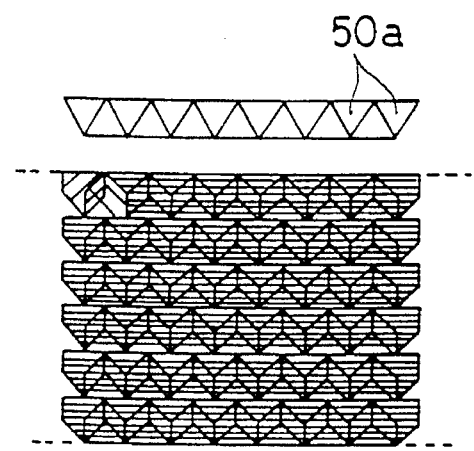
Figure 36B:
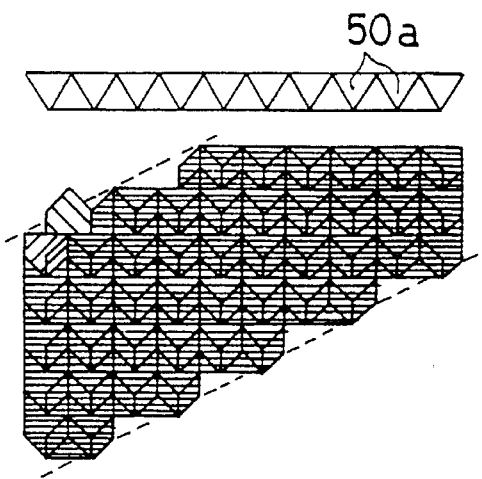
FIG. 36(b) shows a sloped line approximating to a horizontal line.
Figure 36C:
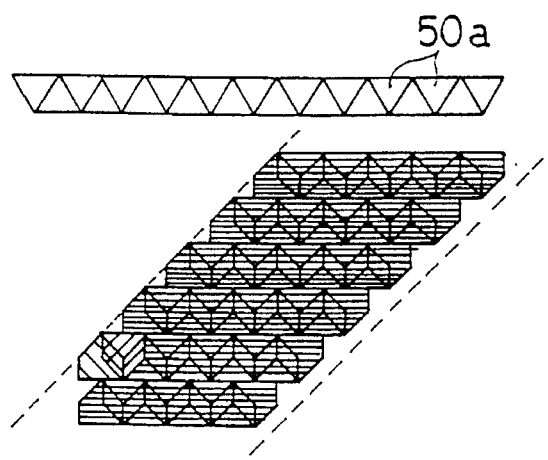
FIG. 36(c) shows a line sloped at 45×.
Figure 36D:
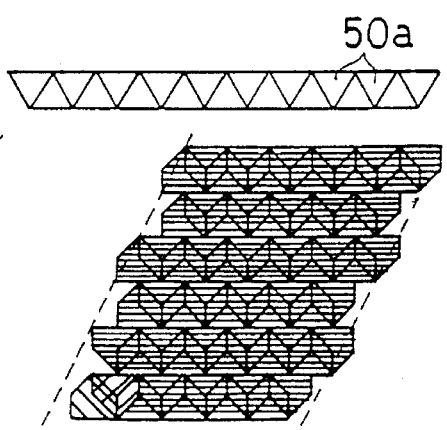
FIG. 36(d) shows a sloped line approximating to a vertical line.
Figure 36E:
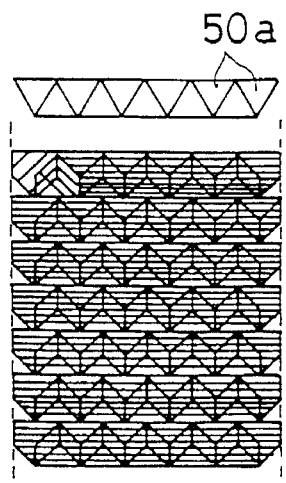
FIG. 36(e) shows a vertical line.

The LED printer according to this embodiment, as shown in FIG. 34, provides an LED array 50 serving as an exposing device and a printer controller (not shown). The LED array 50 is composed of a plurality of luminous elements 50*a* arranged on the long substrate 50*b* in an array format. The printer controller controls the LED array 50, on the basis of the picture signal of a character or a graphic sent from the external host computer. Unlike the printer controller 2 of the first and the second embodiments, the printer controller of the third embodiment is capable of operating the luminous elements 50*a* for a certain length of time without having to perform a pulse width modulation of the picture signal.

Each of the plurality of luminous elements 50*a* composing the LED array 50 has a triangular form. Those luminous elements 50*a* are arranged so that the luminous elements ranged in one row are directed in a reverse manner to those arranged in the adjacent rows. The overall form of those luminous elements is substantially a trapezoid, spreading out upwardly. The LED array 50 is ranged in the longitudinal direction of the substrate 50*b*, that is, the luminous elements 50*a* are arranged in the width direction of the photosensitive drum 31 so that the light scanning is performed on the photosensitive drum 21 with the rotation of the photosensitive drum 21 in the E direction.

The luminous distribution of the luminous element 50*a* formed like a triangle has a distribution width depending on each section of H—H, I—I and J—J as shown in FIG. 35(*a*), each distribution width for those sections being shown in FIGS. 35(*b*), (*c*) and (*d*).

The line printed by the LED printer of this embodiment has one pixel formed like a substantial home base as shown in FIGS. 36(*a*), (*b*), (*c*), (*d*) and (*e*). Hence, in addition to the smoothness of the horizontal line shown in FIG. 36(*a*) and the vertical line shown in FIG. 36(*e*), for the sloped line approximating to the horizontal line shown in FIG. 36(*b*), the sloped line at an angle of slope of 45° shown in FIG. 36(*c*) and the sloped line approximating to the vertical line as shown in FIG. 36(*d*), the slope section of the pixel formed like a substantial home base represents the inclined portion to be printed. This makes great contribution to reducing jaggedness on the printed image.

In addition, the foregoing embodiment does not define the invention and may be modified into various arrangements. For example, the foregoing embodiment is arranged so that the luminous elements 50*a* on the substrate may have a trapezoidal outer form spreading out upwardly. In place, they may have a substantial trapezoidal outer form spreading out downwardly as shown in FIG. 37(*a*) or a substantial parallelogrammic form as shown in FIGS. 37(*b*) and (*c*).

As described above, the image forming apparatus as described in the first embodiment provides the exposure control means which operates to divide the application of a ray forming one pixel into a plurality of lighting times and non-lighting times and form the distribution of light energy for forming one pixel on the photosensitive body as a substantial trapezoid or rhomboid by properly combining the lighting times and the non-lighting times.

The form of the pixels formed as a latent image on the surface of the photosensitive body may have a substantial trapezoidal or rhomboidal form having an inclined portion. By representing the sloped portion and the curve of the image by means of the sloped portion, the jaggedness of the sloped portion or the curve is reduced to enhance the quality of the final printed image. Further, the enhancement of the quality of the image resulting from the reduction in jaggedness does require increasing the recording density. Hence, this may offer an effect that it is possible to avoid the increase of the cost caused by the addition of a costly memory or such components.

The image forming apparatus as described in the second embodiment is arranged to divide one light radiation for forming one pixel into a plurality of lighting times and non-lighting times in the exposure control means and form the light energy distribution on the photosensitive body needed to form one pixel in a manner to contain a substantially diagonal quarter area of one pixel adjacent to the formed pixel.

The image forming apparatus can offer the same effect as the image forming apparatus in the first embodiment. Since the enhancement of the image quality results from the reduction in jaggedness, it is not necessary to increase a recording density. Hence, this apparatus can avoid the increase of a cost of the apparatus itself resulting from the addition of an expensive memory.

The image forming apparatus as described in also the second embodiment is arranged to divide one light radiation for forming one pixel into a plurality of lighting times and non-lighting times in the exposure control means and form the light energy distribution on the photosensitive body needed to form one pixel in a manner to contain a substantially diagonal quarter area of a pixel adjacent to the formed pixel in a main or sub scanning direction by properly combining these lighting times and non-lighting times. The pixel containing a substantially diagonal area of the main scanning directional adjacent pixel formed by the light energy and the pixel containing a substantially diagonal area of the sub scanning directional adjacent pixel formed by the light energy area are located in a manner to allow the substantially diagonal quarter areas to come into contact with each other, so that on the portion where both of the pixels are adjacent to each other, a substantially diagonal half area made from these quarter areas may be formed.

This image forming apparatus may further improve the image quality of the inclined portion or the curve portion.

The image forming apparatus as described in the third embodiment is arranged so that the exposing means included in the image forming apparatus, as described in the first embodiment, is composed of an LED array having a plurality of luminous elements arranged in the width direction of the photosensitive body.

In the LED printer having the LED array served as the exposing means, by dividing the radiation of light into a plurality of lighting times and non-lighting times, each of the pixels composing a latent image formed on the surface of the photosensitive body may have a trapezoidal form with the sloped portion. As such, the LED printer which outputs the sloped line or curve with more obvious jaggy than the other type of printer may greatly reduce jaggedness on the resulting image.

The image forming apparatus as described in also the third embodiment provides an optical lens system in each of the luminous elements composing the LED array, the optical lens system serving to make the distribution form of light spread downwardly.

With this arrangement, the form of a distribution of the light energy for forming one pixel on the photosensitive body is made substantially trapezoidal. Further, without having to provide a complicated exposure control mechanism, the invention may offer the effect that it is possible to improve the quality of the image of the sloped line or the curve.

The image forming apparatus as described in the fourth embodiment is arranged so that each of a plurality of luminous elements composing the LED array may have a triangular form, the luminous elements ranged in one row are directed in a reverse manner to those ranged in the adjacent rows, and the overall outer form is made substantially trapezoidal or parallelogrammic.

With this arrangement, without having to provide a special exposure control means, each of the pixels forming a latent image on the surface of the photosensitive body may have a form with a sloped portion. Hence, this invention may offer the effect that the image forming apparatus of this invention can greatly reduce the cost and enhance the quality of the printed image.

Many widely different embodiments of the present invention may be constructed without departing from the spirit and scope of the present invention. It should be understood that the present invention is not limited to the specific embodiment described in the specification, except as defined in the appended claims.

What is claimed is:

1. An image forming apparatus comprising:

a photosensitive body having a surface on which a latent image, constituted by a plurality of pixels, is to be formed;

exposing means for exposing said surface of said photosensitive body with light radiation; and exposing controlling means for controlling said exposing means in response to a picture signal indicating any character or graphic to be formed as a latent image on the surface of the photosensitive body, said exposing control means including shaping means for controlling said exposing means to form a latent image of a curved or sloped portion of a picture by dividing an exposing time for forming one pixel into a plurality of lighting periods, during which said exposing operation by said exposing means is to be performed, and a plurality of non-lighting periods, during which said exposing operation by said exposing means is to be suspended, and by so sequencing the lighting periods and the non-lighting periods, alternately, that a light energy distribution pattern of substantially trapezoid or rhomboid shape is formed on the photosensitive body.

2. An image forming apparatus according to claim 1, wherein said lighting periods have lengths increasing as time elapses.

3. An image forming apparatus according to claim 1, wherein said lighting periods have lengths decreasing as time elapses.

4. An image forming apparatus according to claim 1, wherein said exposing means is a semiconductor laser.

5. An image forming apparatus according to claim 1, wherein said exposing means is formed of an LED array having a plurality of luminous elements.

6. An image forming apparatus according to claim 1, wherein said exposing controlling means includes control signal generating means for generating a control signal for controlling said exposing means in response to a picture signal, pattern matching means, connected to receive said picture signal, for detecting the curve or sloped portion of a character or a graphic to be formed, a pulse width modulating means for modulating a pulse width based on a detected result from said pattern matching means and generating a pulse modulating clock signal, and means for modulating said control signal according to said pulse modulating clock signal.

7. An image forming apparatus comprising:

a photosensitive body having a surface on which a latent image, constituted by a plurality of pixels, is to be formed;

exposing means for exposing said surface of said photosensitive body with light radiation; and exposing controlling means for controlling said exposing means in response to a picture signal indicating any character or graphic to be formed as a latent image on the surface of the photosensitive body, said exposing control means including shaping means for controlling said exposing means to form a latent image of a curved or sloped portion of a picture by dividing an exposing time for forming one pixel into a plurality of lighting periods, during which said exposing operation by said exposing means is to be performed, and a plurality of non-lighting periods, during which said exposing operation by said exposing means is to be suspended, and by so sequencing the lighting periods and the non-lighting periods, alternately, that a light energy distribution pattern covering a square area for one pixel, and an adjacent diagonal quarter area of a pixel, adjacent to said one pixel, is formed on the photosensitive body.

8. An image forming apparatus according to claim 7, wherein said lighting periods have lengths greater in the middle but smaller at the beginning and the end of the exposing time.

9. An image forming apparatus according to claim 7, wherein said lighting periods have lengths smaller in the middle but greater at the beginning and the end of the exposing time.

10. An image forming apparatus according to claim 7, wherein said photosensitive body is rotated in a sub scanning direction and is scanned by said exposing means in a main scanning direction perpendicular to said sub scanning direction, and wherein said shaping means controls said exposing means to form a first pixel covering a square area for one pixel and an adjacent diagonal quarter area of a pixel, adjacent to said one pixel in said main scanning direction, and a second pixel covering a square area for another pixel diagonally adjacent to said one pixel, and an adjacent diagonal quarter area of a pixel adjacent to said another pixel in said sub scanning direction, and arranging said first pixel and said second pixel in such a manner that said diagonal quarter area of said first pixel, and said diagonal quarter area of said second pixel, are adjacent to each other, to form a pixel covering a diagonal half area of a pixel adjacent to both said one pixel and said another pixel.

11. An image forming apparatus according to claim 7, wherein said exposing controlling means includes control signal generating means for generating a control signal for controlling said exposing means in response to a picture signal, pattern matching means, connected to receive said picture signal, for detecting a curved or sloped portion of a character or a graphic to be formed, a pulse width modulating means for modulating a pulse width based on a detected result from said pattern matching means and generating a pulse modulating clock signal, and means for modulating said control signal according to said pulse modulating clock signal.

* * * * *